(12) United States Patent
Piedrahita et al.

(10) Patent No.: US 12,497,113 B1
(45) Date of Patent: Dec. 16, 2025

(54) COORDINATING DYNAMIC BALANCING WITH OBJECT MANIPULATION BY A ROBOT AND RELATED TECHNOLOGY

(71) Applicant: Agility Robotics, Inc., Pittsburgh, PA (US)

(72) Inventors: Daniel Piedrahita, Portland, OR (US); Alejandro Perez, Manchester, NH (US); Taylor Apgar, Portland, OR (US)

(73) Assignee: Agility Robotics, Inc., Salem, OR (US)

( * ) Notice: Subject to any disclaimer, the term of this patent is extended or adjusted under 35 U.S.C. 154(b) by 331 days.

(21) Appl. No.: 18/188,079

(22) Filed: Mar. 22, 2023

Related U.S. Application Data

(60) Provisional application No. 63/490,488, filed on Mar. 15, 2023.

(51) Int. Cl.
  *B62D 57/032* (2006.01)
  *B25J 9/16* (2006.01)
(52) U.S. Cl.
  CPC .......... *B62D 57/032* (2013.01); *B25J 9/1664* (2013.01); *B25J 9/1682* (2013.01)
(58) Field of Classification Search
  CPC ...... B62D 57/032; B25J 9/1682; B25J 9/1664
  See application file for complete search history.

(56) References Cited

U.S. PATENT DOCUMENTS

| | | | |
|---|---|---|---|
| 8,996,175 B2 | 3/2015 | Blumberg et al. | |
| 2019/0283822 A1* | 9/2019 | Blankespoor | B62D 57/032 |
| 2022/0348409 A1* | 11/2022 | Sun | B65G 1/1371 |
| 2022/0410378 A1 | 12/2022 | Deits et al. | |

FOREIGN PATENT DOCUMENTS

| | | | | |
|---|---|---|---|---|
| EP | 1795437 A2 * | 6/2007 | .......... | B62D 57/032 |
| JP | 2007007797 | 1/2007 | | |

* cited by examiner

*Primary Examiner* — Khoi H Tran
*Assistant Examiner* — Alyse Tramanh Tran

(57) ABSTRACT

A method in accordance with at least some embodiments of the present technology includes retrieving, by a legged robot, an object from a pick target while the legged robot is in a first dynamic balancing state. The method further includes carrying, by the legged robot, the object toward a place target spaced apart from the pick target while the legged robot ambulates over a floor surface. The method further includes placing, by the legged robot, the object at the place target while the legged robot is in a second dynamic balancing state. The legged robot in one of the first and second dynamic balancing states maintains its balance while its feet are planted on the floor surface. The legged robot in the other of the first and second dynamic balancing states maintains its balance while at least one of the feet moves relative to the floor surface.

20 Claims, 27 Drawing Sheets

COORDINATING DYNAMIC BALANCING WITH OBJECT MANIPULATION BY A ROBOT AND RELATED TECHNOLOGY

CROSS-REFERENCE TO RELATED APPLICATION

This claims the benefit of U.S. Provisional Application No. 63/490,488, filed Mar. 15, 2023. The foregoing application is incorporated herein by reference in its entirety. To the extent the foregoing applications or any other material incorporated by reference conflicts with the present disclosure, the present disclosure controls.

TECHNICAL FIELD

The present technology relates to robots that interact with objects.

BACKGROUND

Many simple tasks that humans currently perform are amenable to automation using robotics. Among such tasks are those involving moving goods between locations within distribution centers. For example, after a trailer containing goods arrives at a distribution center, human workers may move the goods from the trailer onto conveyors that carry the goods to other locations within the distribution center for further processing. Similarly, although conveyors can be used to deliver outgoing goods to loading docks and to palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

DETAILED DESCRIPTION

Figure 1:
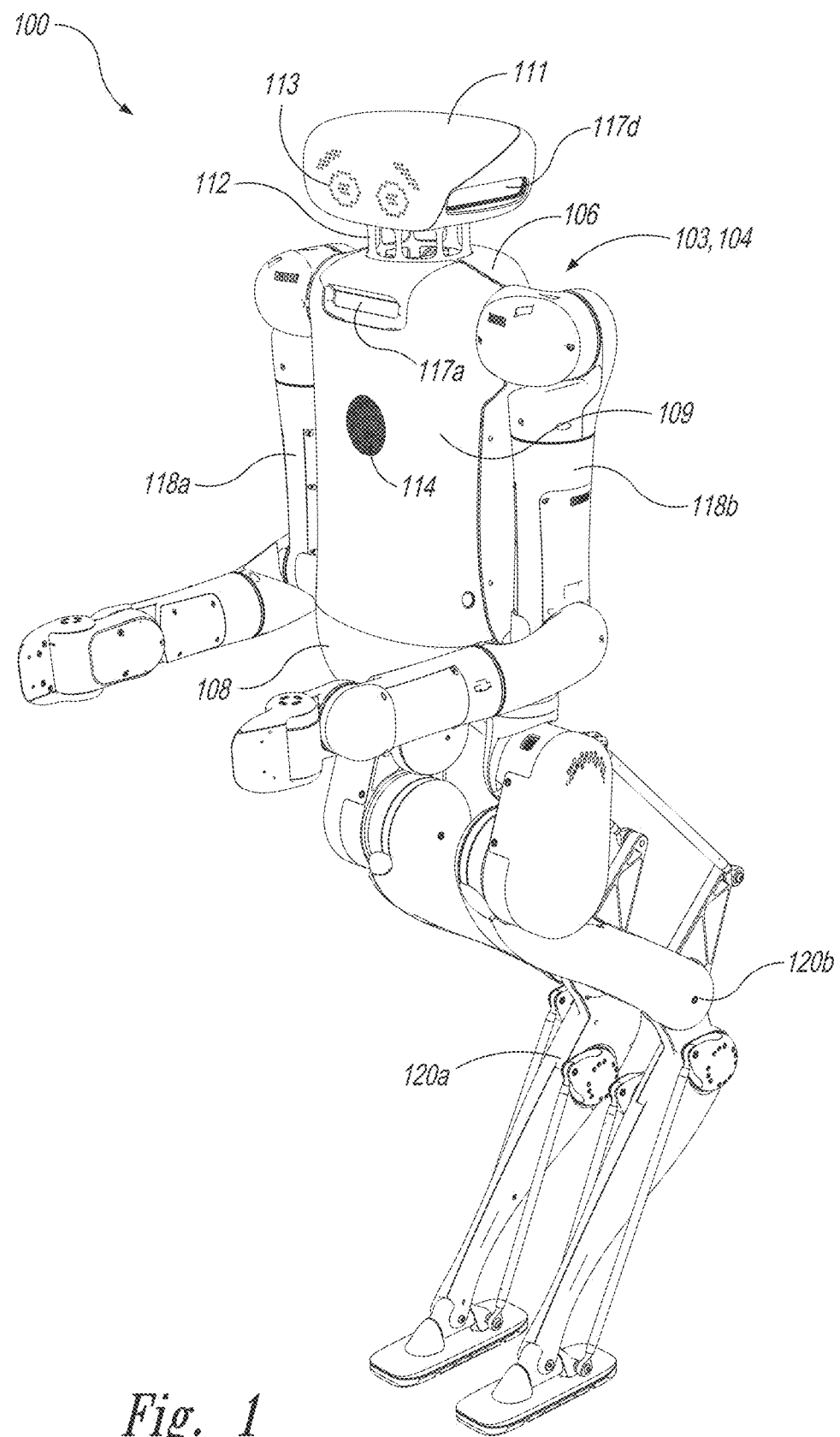
FIGS. 1-3 are, respectively, a first perspective view, a second perspective view, and a front profile view of a robot in accordance with at least some embodiments of the present technology with the robot being in a first state.

Disclosed herein are devices, systems, and methods for using a robot to accomplish a task involving an object, such as moving the object from one location to another location. Devices, systems, and methods in accordance with at least some embodiments of the present technology include one or more innovative features related to coordinating a dynamic balancing state of a robot with such a task. These features may be particularly useful in the context of bipedal robots, but may also be useful in other contexts. Due to their compact form factor, humanoid characteristics, and/or other factors, bipedal robots tend to be well suited to working in environments built for humans. Bipedal robots, for example, can often advantageously be deployed to work alongside humans in distribution centers, factories, and warehouses. Bipedal robots also tend to be more agile and more capable of working together in large numbers than other types of robots. Accompanying these advantages, however, are challenges associated with balancing. Unlike tripedal and quadrupedal robots, most bipedal robots fall over in the absence of some form of feedback-based control. In an example of this control, a bipedal robot may include an inertial measurement unit that the robot uses to sense a change in a balance-related variable, such as orientation. In response to sensing this change, the robot may move one or more of its joints to change its center of mass and/or center of pressure in a manner that compensates for the change. So long as the robot continues to make such adjustments, it remains upright and can perform useful work.

There are typically many kinematic solutions available to compensate for a given change in balance. For example, a bipedal robot may move one leg, move the other leg, move one arm, move the other arm, move both arms, etc. to shift its center of mass and/or center of pressure in a direction opposite to a direction in which the robot senses its center of mass and/or center of pressure to be drifting. Robots in accordance with at least some embodiments of the present technology operate in more than one state with regard to selecting among these redundant kinematic solutions. For example, a robot in accordance with at least some embodiments of the present technology operates in a standing state when its feet are planted and in a non-standing state when its feet are not planted. In the standing state, maintaining the respective positions of the robot's feet on a floor surface can be imposed as a constraint on the kinematic solutions available to the robot to compensate for changes in balance. In contrast, in the non-standing state, this constraint can be absent. The standing state, although incompatible with walking, may be advantageous for operations that involve moving an object relative to a body of the robot via arms of the robot, such as using the robot's arms to retrieve or to place an object. The body and arms of a bipedal robot tend to move more predictably when the robot is in a standing state than when the robot is in a non-standing state even if the non-standing state is one in which the robot walks in place. Accordingly, object-handling operations using a bipedal robot have conventionally been performed while the robot's feet are planted.

Although executing object-handling operations via a bipedal robot while the robot's feet are planted may enhance the precision of these operations, this approach may have certain disadvantages in at least some cases. Among these potential disadvantages is reduced efficiency. For example, transitioning a bipedal robot from a walking state to a standing state takes time and, therefore, reduces throughput. It also consumes power and computing resources. In some cases, the transition involves the robot making a series of progressively smaller adjustments to respective positions of its feet. As another example, the added constraint of maintaining planted feet may make a bipedal robot more susceptible to falling when the robot is in a standing state than when the robot is in a non-standing state. Relatedly, this constraint may cause a bipedal robot to be less capable of responding appropriately to unexpected events (e.g., a strong impact, lifting an unusually heavy object, etc.). Yet another consideration is that frequent transitions between standing and non-standing states may cause a robot's motion to be less legible and less predictable to humans than would otherwise be the case. Finally, frequent transitions between standing and non-standing states can reduce the operating life of movable parts, such as actuators and gears.

For the foregoing and/or other reasons, methods in accordance with at least some embodiments of the present technology include selectively bypassing or otherwise limiting transitions from a non-standing state to a standing state in robot operations involving an object. For example, a method in accordance with at least some embodiments of the present technology includes executing a high-precision object-handling operation via a bipedal robot while the robot is in a standing state and executing a lower-precision object-handling operation via the robot while the robot is in a non-standing state. In distribution centers and elsewhere, a working robot may be expected to execute over a thousand object-handling operations every day. Even if bypassing a standing state is only suitable for some types of operations and even if this change only reduces the time to execute each operation by a few seconds, the cumulative effect can be significant. This is particularly true across fleets of hundreds or thousands of robots. Moreover, as discussed above, coordinating dynamic balancing with object manipulation can have other advantages unrelated to speed.

Also disclosed are methods for autonomously determining whether or not to transition a robot from a non-standing state to a standing state in conjunction with a given object-handling operation. For example, a method in accordance with at least some embodiments of the present technology includes receiving information about a target for placing an object and determining whether or not to transition a robot from a non-standing state to a standing state based at least partially on this information. The information can include a condition, a type, and/or another characteristic of the target. Furthermore, the information can indicate whether placing an object at the target calls for high precision or is tolerant of low precision with respect to a position of the object and/or the robot during and/or after the placement. Examples of information useful for this purpose include the presence or absence of a peripheral obstruction at the target, whether or not the target is moving, and a type of the target (e.g., shelf, conveyor, other robot, human, etc.). Similar methods disclosed herein involve autonomously determining whether or not to transition a robot from a non-standing state to a standing state in conjunction with retrieving an object.

The foregoing and other features of methods and associated devices and systems in accordance with various embodiments of the present technology are further described below with reference to FIGS. 1-63. Although methods, devices, and systems may be described herein primarily or entirely in the context of using bipedal robots to move totes, other contexts are within the scope of the present technology. For example, suitable features of described methods, devices, and systems can be implemented in the context of other legged robots capable of feedback-based balancing even if such robots have more than two legs and/or are capable of standing in a stable state without feedback-based balancing. Furthermore, suitable features of described methods, devices, and systems can be implemented in the context of robotically manipulating objects other than totes, such as boxes, crates, non-packaged hard goods, irregularly shaped objects, etc. Finally, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Robot Systems

Figure 2:
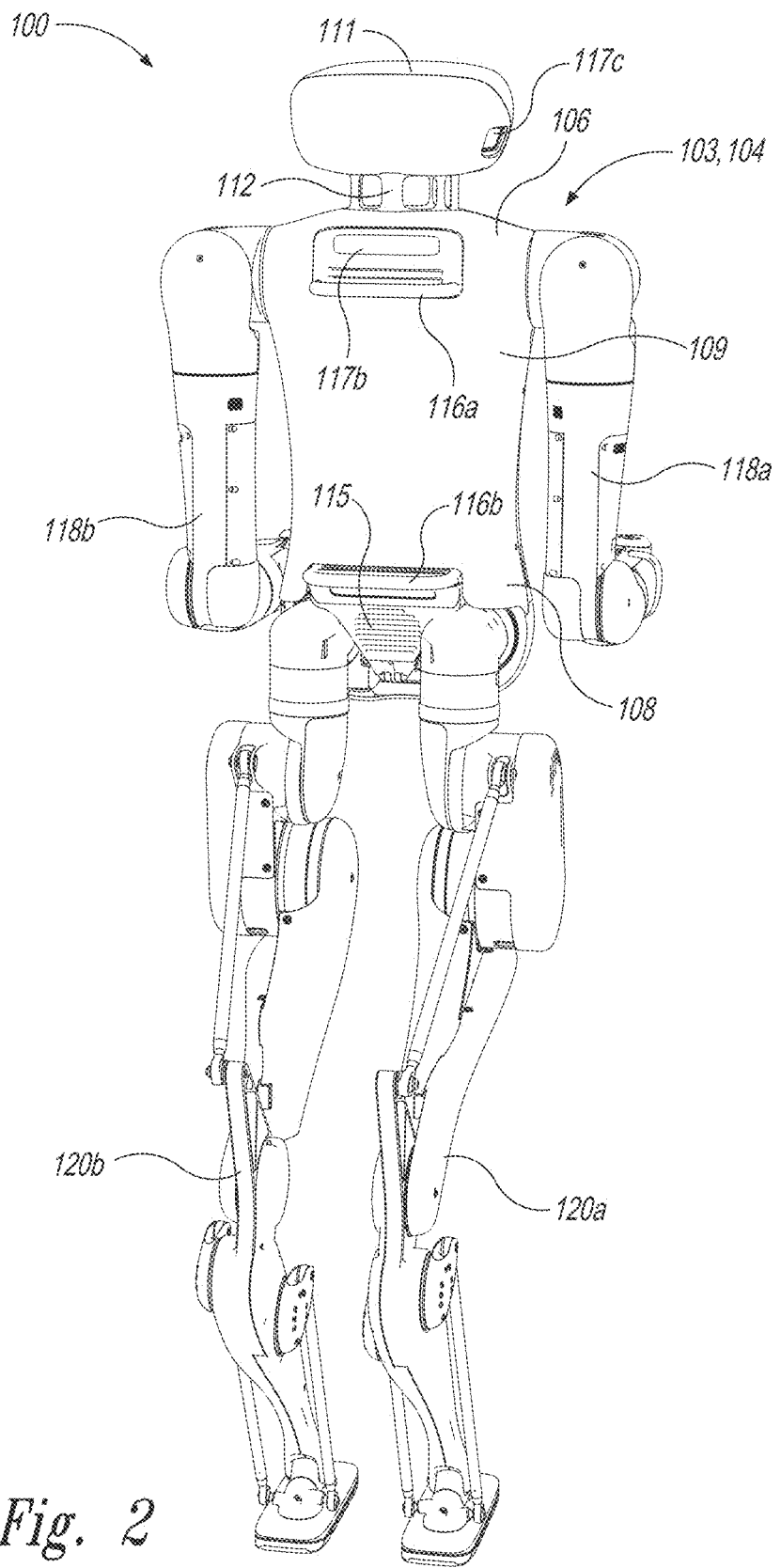
Figure 3:
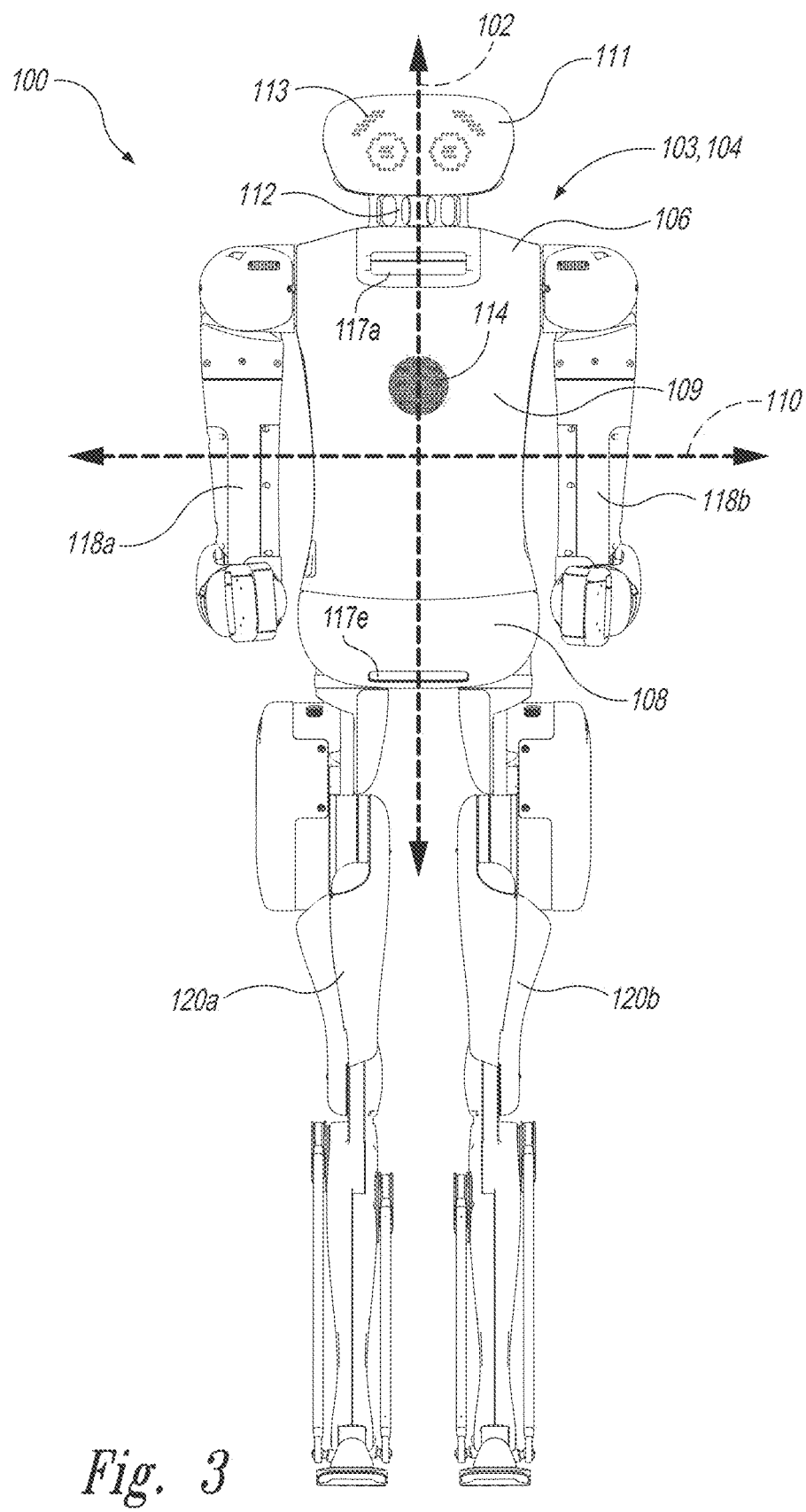
Figure 4:
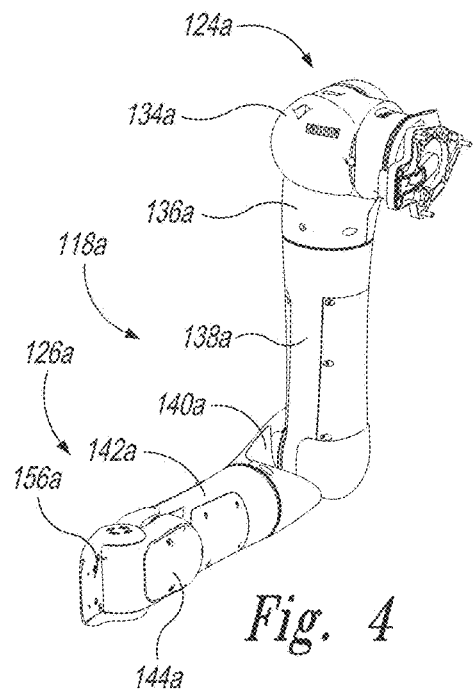
FIGS. 4-7 are perspective views of a first arm, a second arm, a first leg, and a second leg, respectively, of the robot shown in FIG. 1.
Figure 5:
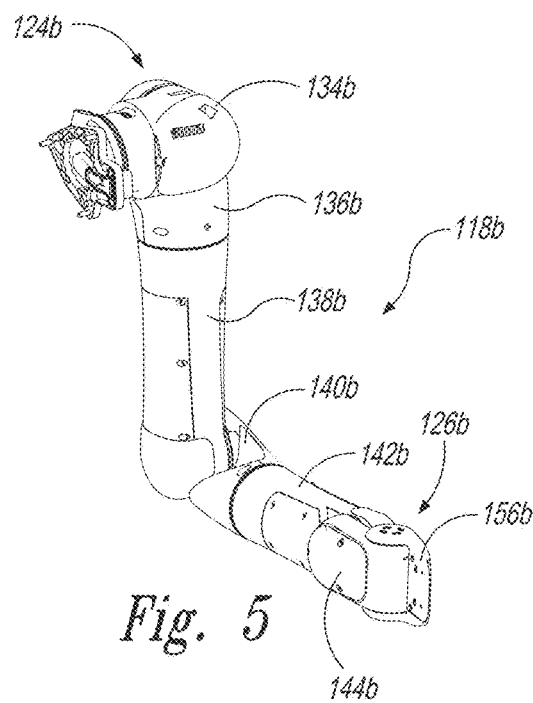
Figure 6:
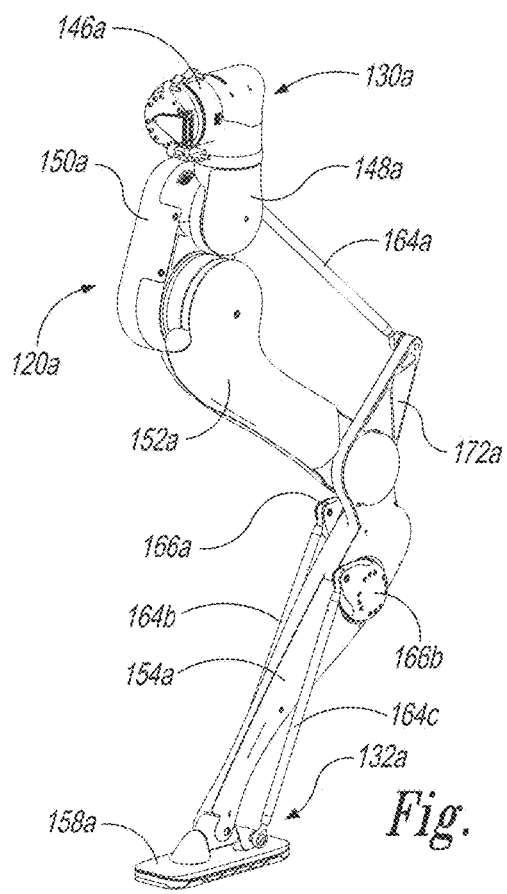
Figure 7:
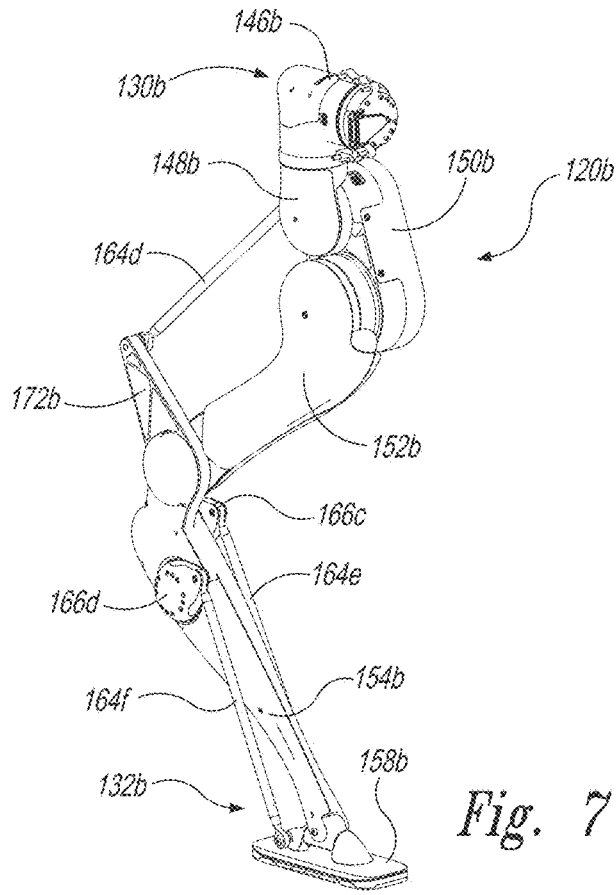
Figure 8:
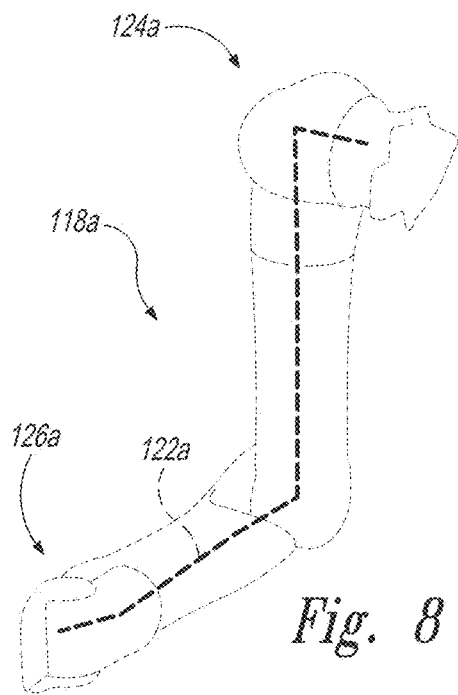
FIGS. 8-11 are silhouette views of the first arm, the second arm, the first leg, and the second leg, respectively, of the robot shown in FIG. 1 illustrating corresponding arm and leg lengths.
Figure 9:
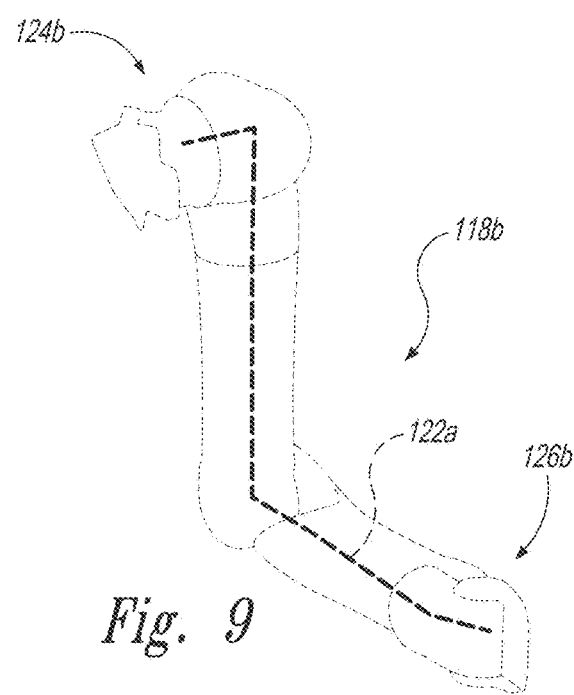
Figure 10:
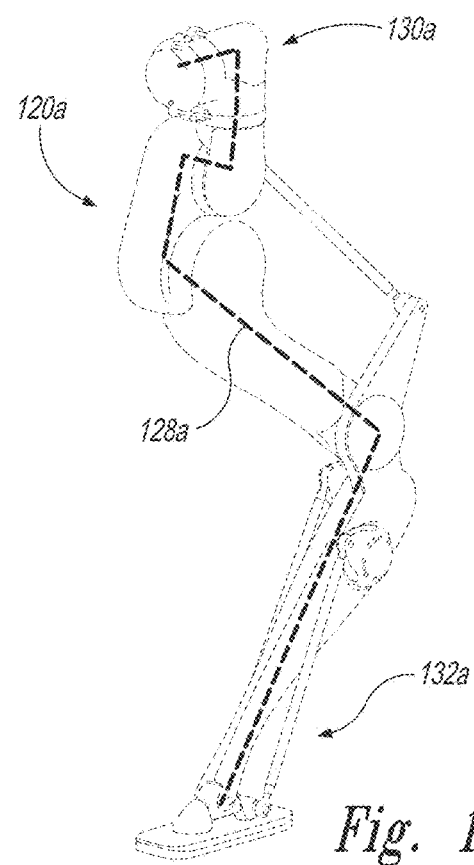
Figure 11:
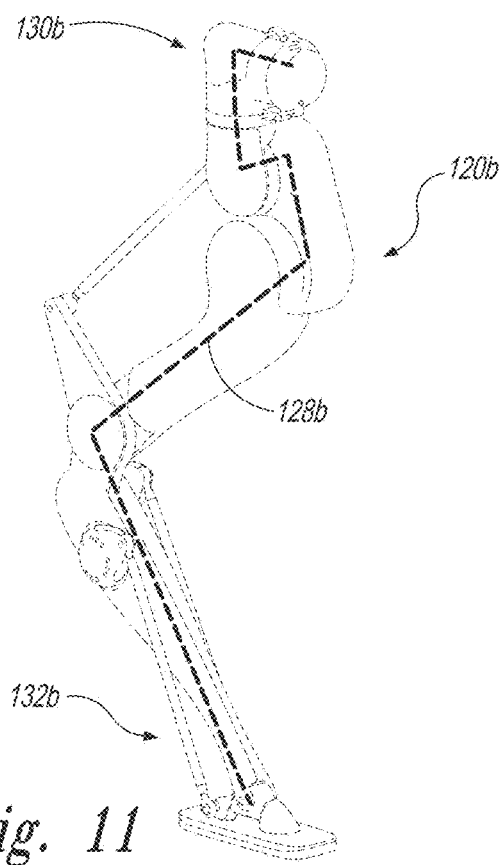
Figure 12:
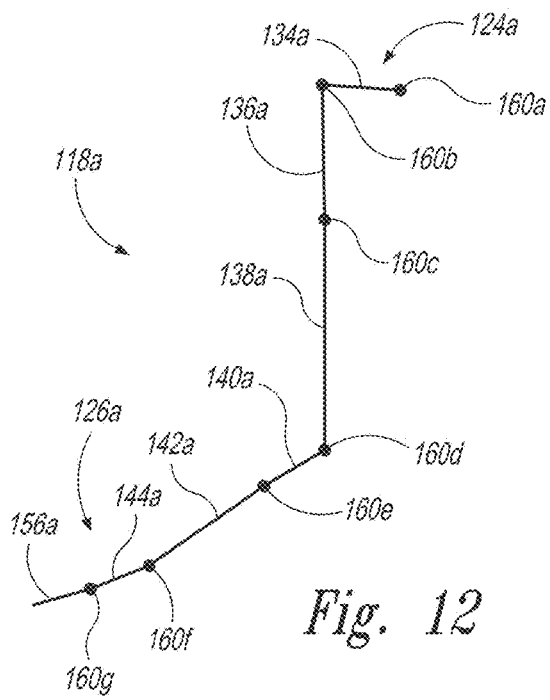
FIGS. 12-15 are partially schematic diagrams showing kinematic chains corresponding, respectively, to the first arm, the second arm, the first leg, and the second leg of the robot shown in FIG. 1.
Figure 13:
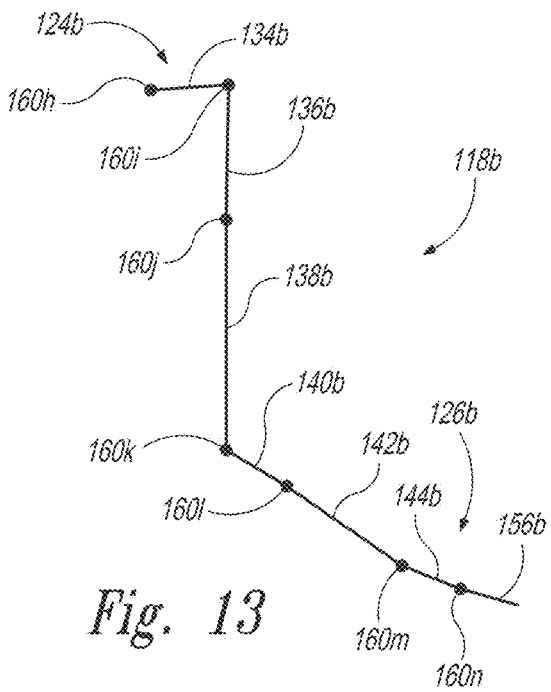
Figure 14:
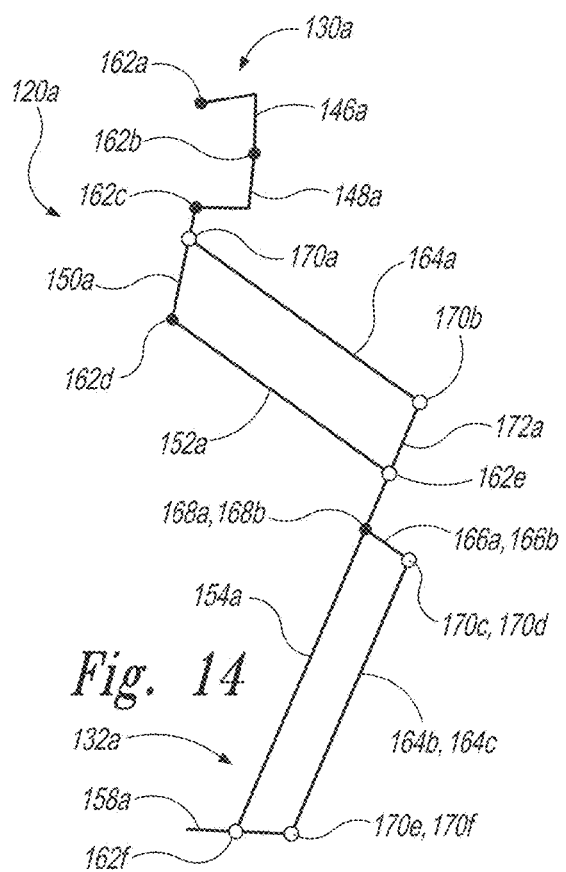
Figure 15:
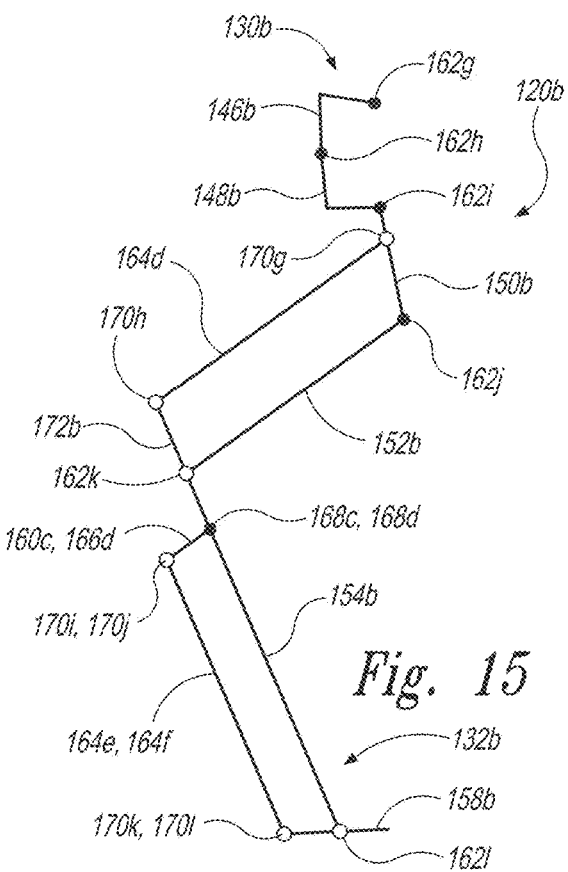

FIGS. 1 and 2 are different perspective views of a robot 100 in accordance with at least some embodiments of the present technology. FIG. 3 is a front profile view of the robot 100. As shown in FIGS. 1-3, the robot 100 can have a humanoid form. The robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113 including light-emitting diodes selectively controllable to create a composite, pixelated image evocative of human facial expression. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104. The robot 100 can still further include sensor arrays 117 (individually identified as sensor arrays 117a-117e) carried by the torso 104 and the head 111. The sensor arrays 117a, 117b can be at the superior portion 106 of the torso 104 and anteriorly and posteriorly directed, respectively. The sensor arrays 117c, 117d can be at opposite respective sides of the head 111 and can be directed in opposite respective lateral directions. The sensor array 117e can be at the inferior portion 108 of the torso 104 and directed anteriorly and inferiorly toward a ground level in front of the robot 100.

The robot 100 can further include articulated appendages carried by the torso 104. Among these articulated appendages, the robot 100 can include arms 118a, 118b and legs 120a, 120b. In at least some cases, the robot 100 is configured to manipulate objects via the arms 118a, 118b, such as bimanually. In these and other cases, the robot 100 can be configured to ambulate via the legs 120a, 120b, such as bipedally. FIGS. 4-15 show selected features of the arms 118a, 118b and legs 120a, 120b in greater detail. In particular, FIGS. 4-7 are perspective views of the arms 118a, 118b and legs 120a, 120b, respectively. FIGS. 8-11 are silhouette views of the arms 118a, 118b and legs 120a, 120b, respectively. Finally, FIGS. 12-15 are partially schematic diagrams showing kinematic chains corresponding to the arms 118a, 118b and legs 120a, 120b, respectively. In FIGS. 12-15, lines represent links, filled circles represent active joints, and open circles represent inactive joints.

With reference to FIGS. 1-15 together, the arms 118a, 118b can define respective arm lengths 122a, 122b extending from the torso 104. For clarity of illustration, the arm lengths 122a, 122b are only indicated in FIGS. 8 and 9, respectively. The arms 118a, 118b can have respective proximal end portions 124a, 124b and respective distal end portions 126a, 126b at opposite ends of the respective arm lengths 122a, 122b. The arms 118a, 118b can be connected to the torso 104 via the respective proximal end portions 124a, 124b thereof and the superior portion 106 of the torso 104. Similar to the arms 118a, 118b, the legs 120a, 120b can define respective leg lengths 128a, 128b extending from the torso 104. For clarity of illustration, the leg lengths 128a, 128b are only indicated in FIGS. 10 and 11, respectively. The legs 120a, 120b can have respective proximal end portions 130a, 130b and respective distal end portions 132a, 132b at opposite ends of the respective leg lengths 128a, 128b. The legs 120a, 120b can be connected to the torso 104 via the respective proximal end portions 130a, 130b thereof and the inferior portion 108 of the torso 104.

The arms 118a, 118b and the legs 120a, 120b can define kinematic chains. In at least some cases, the kinematic chains corresponding to the arms 118a, 118b provide at least five degrees of freedom, such as exactly five or exactly six degrees of freedom. In these and other cases, the kinematic chains corresponding to the legs 120a, 120b can provide at least four degrees of freedom, such as exactly four, exactly five, or exactly six degrees of freedom. The robot 100 can include links at progressively more distal (i.e., lower) levels within the kinematic chains corresponding to the arms 118a, 118b and the legs 120a, 120b and at progressively more distal (i.e., farther) positions along the arm lengths 122a, 122b and the leg lengths 128a, 128b. As parts of the arms 118a, 118b, the robot 100 can include proximal shoulder links 134a, 134b, distal shoulder links 136a, 136b, upper arm links 138a, 138b, elbow links 140a, 140b, lower arm links 142a, 142b, and wrist links 144a, 144b. Similarly, as parts of the legs 120a, 120b, the robot 100 can include proximal hip links 146a, 146b, distal hip links 148a, 148b, proximal thigh links 150a, 150b, distal thigh links 152a, 152b, and calf links 154a, 154b.

As further parts of the arms 118a, 118b, the robot 100 can include end effectors 156a, 156b opposite to the proximal end portions 124a, 124b along the arm lengths 122a, 122b and distal to the wrist links 144a, 144b. As further parts of the legs 120a, 120b, the robot 100 can include feet 158a, 158b opposite to the proximal end portions 130a, 130b along the leg lengths 128a, 128b and distal to the calf links 154a, 154b. The end effectors 156a, 156b can be at distalmost positions along the arm lengths 122a, 122b. Similarly, the feet 158a, 158b can be at distalmost positions along the leg lengths 128a, 128b. In the illustrated embodiment, the end effectors 156a, 156b and the feet 158a, 158b are not articulated. In other embodiments, counterparts of some or all of the end effectors 156a, 156b and the feet 158a, 158b can be articulated, such as with one or more movable fingers or toes.

With reference again to FIGS. 1-15, the robot 100 can include arm joints 160 (individually identified as arm joints 160a-160n) as parts of the arms 118a, 118b. The arm joints 160a-160n can be disposed between neighboring links within the kinematic chains corresponding to the arms 118a, 118b and at opposite ends of these kinematic chains. For clarity of illustration, the arm joints 160 are only indicated in FIGS. 12 and 13. The robot 100 can further include leg joints 162 (individually identified as leg joints 162a-162l) as parts of the legs 120a, 120b. Similar to the arm joints 160a-160n, the leg joints 162a-162l can be disposed between neighboring links within the kinematic chains corresponding to the legs 120a, 120b and at opposite ends of these kinematic chains. For clarity of illustration, the leg joints 162 are only indicated in FIGS. 14 and 15. The arm joints 160a-160n and the leg joints 162a-162l may be referenced herein in connection with the distally neighboring link along the kinematic chain of the corresponding one of the arms 118a, 118b and the legs 120a, 120b. For example, the arm joints 160f, 160m may be referenced herein as the wrist joints 160f, 160m.

In FIGS. 1-3, the robot 100 is shown in a first state, which can correspond to a home pose, a neutral pose, etc. well-suited to an object-manipulation task. In the first state, the proximal shoulder links 134a, 134b can extend laterally from the torso 104. Also, in the first state, the distal shoulder links 136a, 136b and the upper arm links 138a, 138b can extend inferiorly from the proximal shoulder links 134a, 134b. Also, in the first state, the elbow links 140a, 140b, the lower arm links 142a, 142b, and the wrist links 144a, 144b can extend anteriorly from the upper arm links 138a, 138b. Also, in the first state, the proximal hip links 146a, 146b can extend posteriorly from the torso 104. Also, in the first state, the distal hip links 148a, 148b and the proximal thigh links 150a, 150b can extend inferiorly from the proximal hip links 146a, 146b. Also, in the first state, the distal thigh links 152a, 152b can extend inferiorly and posteriorly from the proximal thigh links 150a, 150b. Finally, in the first state, the calf links 154a, 154b can extend inferiorly and anteriorly from the distal thigh links 152a, 152b.

In at least some cases, the calf joints 162e, 162k and the foot joints 162f, 162l are passive. As additional parts of the legs 120a, 120b, the robot 100 can include connection shafts 164 (individually identified as connection shafts 164a-164f), cranks 166 (individually identified as cranks 166a-166d), ancillary active joints 168 (individually identified as ancillary active joints 168a-168d), and ancillary passive joints 170 (individually identified as ancillary passive joints 170a-170l). The connection shafts 164a, 164d can extend between the proximal thigh links 150a, 150b and the calf links 154a, 154b. When the robot 100 is in the first state, the connection shafts 164a, 164d can be posteriorly spaced apart from the distal thigh links 152a, 152b and within 10 degrees of parallel to (e.g., within 5 degrees of parallel to and/or substantially parallel to) corresponding portions of the leg lengths 128a, 128b. Moving the distal thigh joints 162d, 162j from their positions when the robot 100 is in the first state can cause the connection shafts 164a, 164d to move increasingly off parallel from the corresponding portions of the leg lengths 128a, 128b.

The calf links 154a, 154b can include projections 172a, 172b extending posteriorly and superiorly from the calf joints 162e, 162k. The ancillary passive joints 170a, 170b can be at opposite ends of the connection shaft 164*a*. Similarly, the ancillary passive joints 170*g*, 170*h* can be at opposite ends of the connection shaft 164*d*. Due to their kinematic arrangement, an actuated position of the distal thigh joint 162*d* can dictate positions of the calf joint 162*e* and of the ancillary passive joints 170*a*, 170*b*. Similarly, due to their kinematic arrangement, an actuated position of the distal thigh joint 162*j* can dictate positions of the calf joint 162*k* and of the ancillary passive joints 170*g*, 170*h*. The calf links 154*a*, 155*b* can carry the cranks 166*a*, 166*c* laterally. The calf links 154*a*, 155*b* can further carry the cranks 166*b*, 166*d* medially. The ancillary active joints 168*a*, 168*b* can be between the cranks 166*a*, 166*b* and the calf link 154*a*. Similarly, the ancillary active joints 168*c*, 168*d* can be between the cranks 166*c*, 166*d* and the calf link 154*b*.

The connection shafts 164*b*, 164*c* can extend between the cranks 166*a*, 166*b* and the foot 158*a* and can be spaced apart laterally and medially, respectively, from the calf link 154*a*. Similarly, the connection shafts 164*e*, 164*f* can extend between the cranks 166*c*, 166*d* and the foot 158*b* and can be spaced apart laterally and medially, respectively, from the calf link 154*b*. The ancillary passive joints 170*c*, 170*e* can be at opposite ends of the connection shaft 164*b*. The ancillary passive joints 170*d*, 170*f* can be at opposite ends of the connection shaft 164*c*. The ancillary passive joints 170*i*, 170*k* can be at opposite ends of the connection shaft 164*e*. Finally, the ancillary passive joints 170*j*, 170*l* can be at opposite ends of the connection shaft 164*f*. The ancillary active joints 168*a*, 168*b* can be configured to operate in concert to move the foot 158*a* relative to the calf link 154*a*. Due to their kinematic arrangement, actuated positions of the ancillary active joints 168*a*, 168*b* can dictate positions of the foot joint 162*f* and of the ancillary passive joints 170*c*-170*f*. Similarly, the ancillary active joints 168*c*, 168*d* can be configured to operate in concert to move the foot 158*b* relative to the calf link 154*b*. Due to their kinematic arrangement, actuated positions of the ancillary active joints 168*c*, 168*d* can dictate positions of the foot joint 162*l* and of the ancillary passive joints 170*i*-170*l*.

The relative orientations of the arm joints 160*a*-160*l*, the relative positions of the arm joints 160*a*-160*l*, the dimensions of the links within the kinematic chains corresponding to the arms 118*a*, 118*b*, the shapes of these links, and/or other features of the arms 118*a*, 118*b* can provide advantages over conventional alternatives. Examples of these advantages include enhanced maneuverability, enhanced range of motion, enhanced economy of motion, reduced occurrence of kinematic singularities during certain operations (e.g., object lifting, object carrying, etc.), closer emulation of human arm kinematics, and closer emulation of human arm conformation, among others. Furthermore, the relative orientations of the leg joints 162*a*-162*l*, the relative positions of the leg joints 162*a*-162*l*, the dimensions of the links within the kinematic chains corresponding to the legs 120*a*, 120*b*, the shapes of these links, and/or other features of the legs 120*a*, 120*b* can provide advantages over conventional alternatives. Examples of these advantages include enhanced maneuverability, enhanced range of motion, enhanced economy of motion, reduced occurrence of kinematic singularities during certain operations (e.g., walking, running, etc.), closer emulation of human leg kinematics, and closer emulation of human leg conformation, among others.

Figures 16, 17:
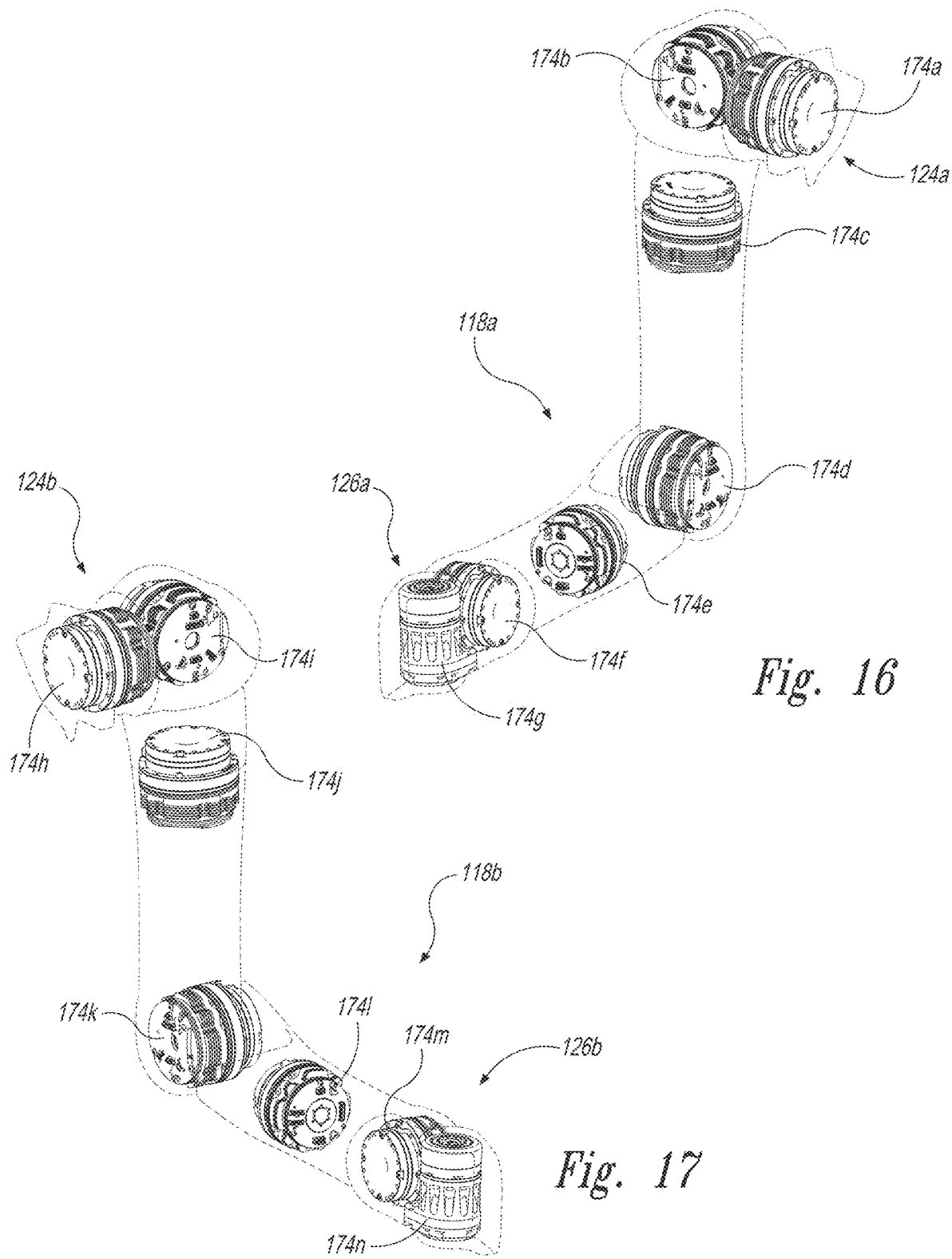
FIGS. 16-19 are partially transparent perspective views of the first arm, the second arm, the first leg, and the second leg, respectively, of the robot shown in FIG. 1 illustrating corresponding arm and leg actuators.

FIGS. 16 and 17 are partially transparent perspective views of the arms 118*a*, 118*b*, respectively. As shown in FIGS. 16 and 17, the robot 100 can include arm actuators 174 (individually identified as arm actuators 174*a*-174*n*) as parts of the arms 118*a*, 118*b*. The arm actuators 174*a*-174*n* can be embedded within, mounted to, or otherwise carried by the links within the kinematic chains corresponding to the arms 118*a*, 118*b*. In the illustrated embodiment, the arm actuators 174*a*-174*n* are incorporated into the arms 118*a*, 118*b* in the following manner. The arm actuators 174*a*, 174*h* are embedded within portions of the proximal shoulder links 134*a*, 134*b* at the proximal shoulder joints 160*a*, 160*h*. The arm actuators 174*b*, 174*i* are embedded within portions of the proximal shoulder links 134*a*, 134*b* at the distal shoulder joints 160*b*, 160*i*. The arm actuators 174*c*, 174*j* are embedded within portions of the upper arm links 138*a*, 138*b* at the upper arm joints 160*c*, 160*j*. The arm actuators 174*d*, 174*k* are embedded within portions of the upper arm links 138*a*, 138*b* at the elbow joints 160*d*, 160*k*. The arm actuators 174*e*, 174*l* are embedded within portions of the lower arm links 142*a*, 142*b* at the lower arm joints 160*e*, 160*l*. The arm actuators 174*f*, 174*m* are embedded within portions of the lower arm links 142*a*, 142*b* at the wrist joints 160*f*, 160*m*. Finally, the arm actuators 174*g*, 174*n* are embedded within portions of the wrist links 144*a*, 144*b* at the end effector joints 160*g*, 160*n*.

Figure 18:
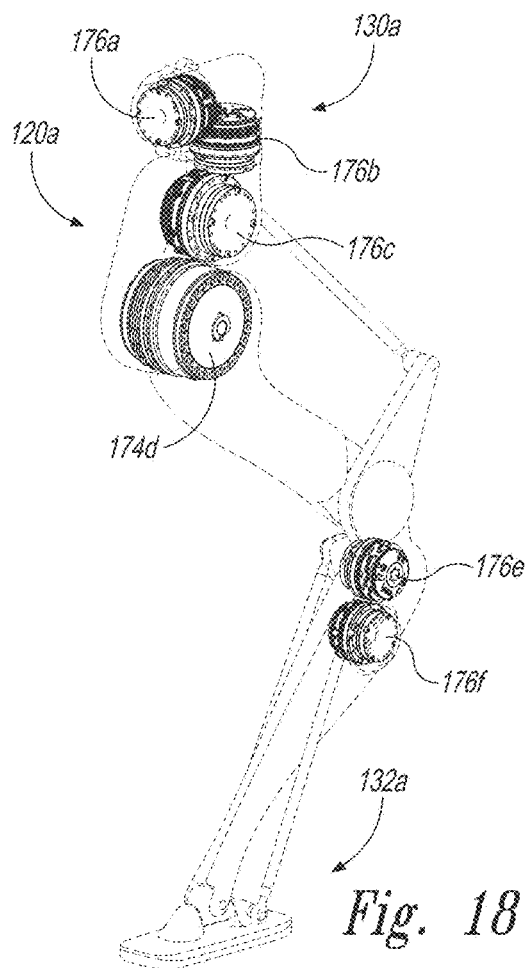
Figure 19:
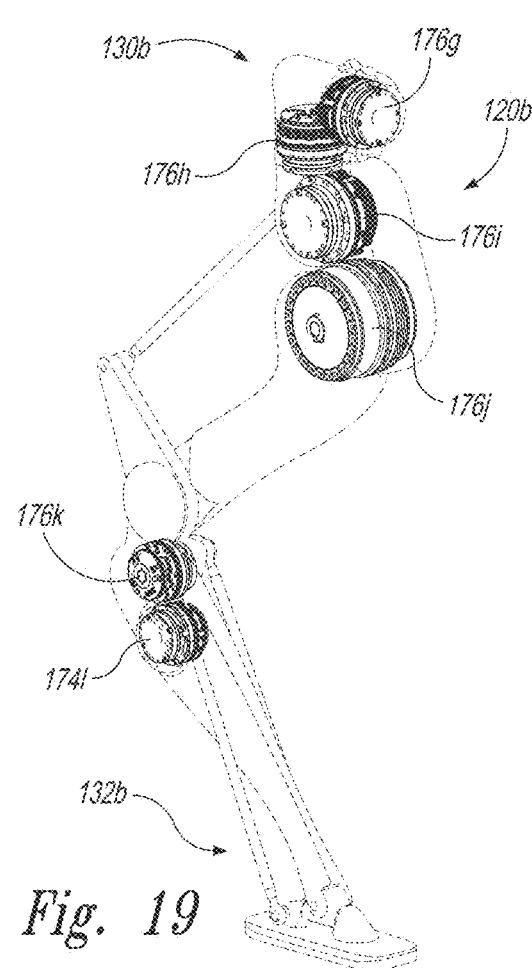
Figure 20:
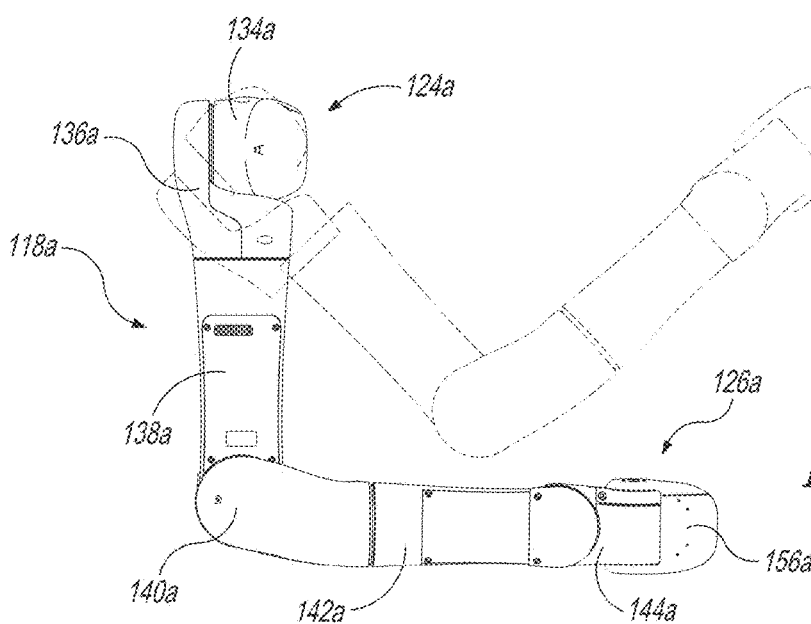
FIG. 20 is a side profile view of the first arm of the robot shown in FIG. 1 indicating isolated motion about an arm joint of the robot.
Figure 21:
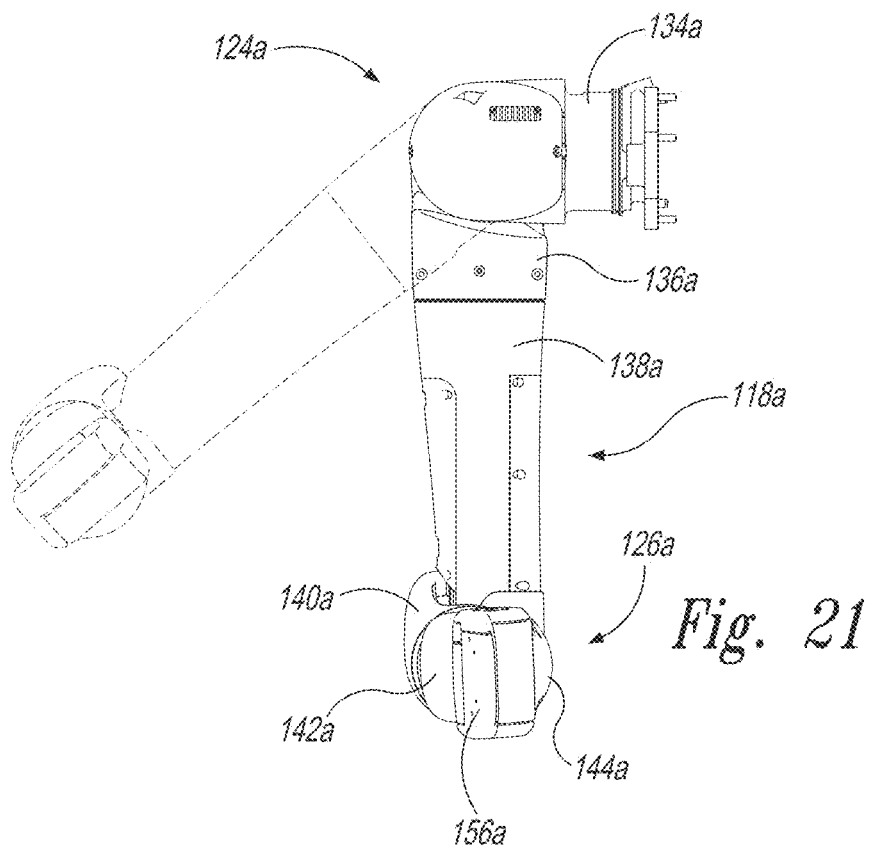
FIG. 21 is a front profile view of the first arm of the robot shown in FIG. 1 indicating isolated motion about an arm joint of the robot distal to the arm joint of FIG. 20 along the kinematic chain of FIG. 12.
Figure 22:
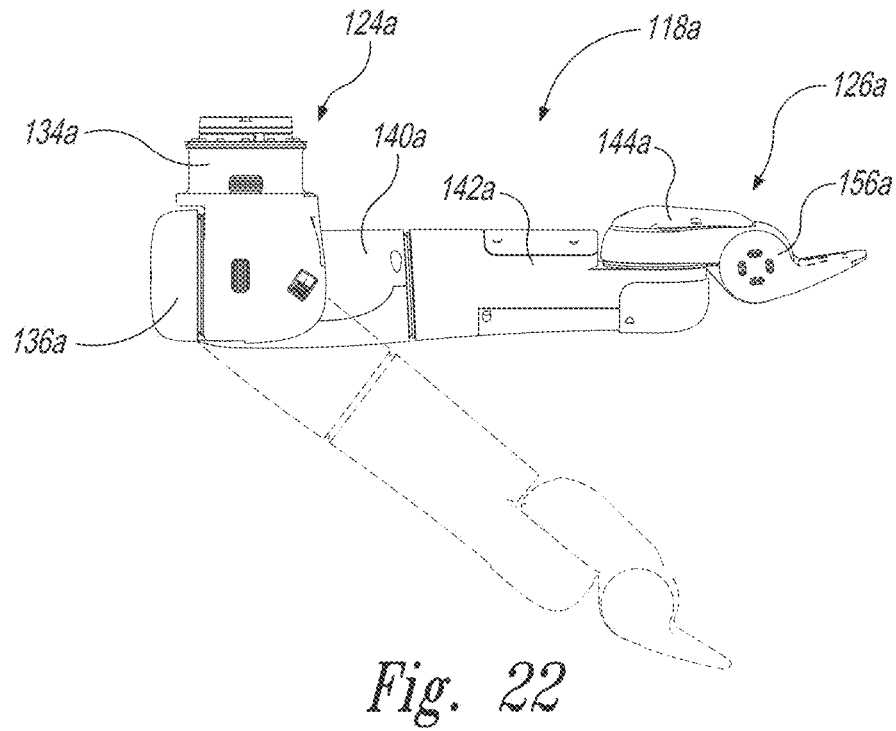
FIG. 22 is a top plan view of the first arm of the robot shown in FIG. 1 indicating isolated motion about an arm joint of the robot distal to the arm joint of FIG. 21 along the kinematic chain of FIG. 12.
Figure 23:
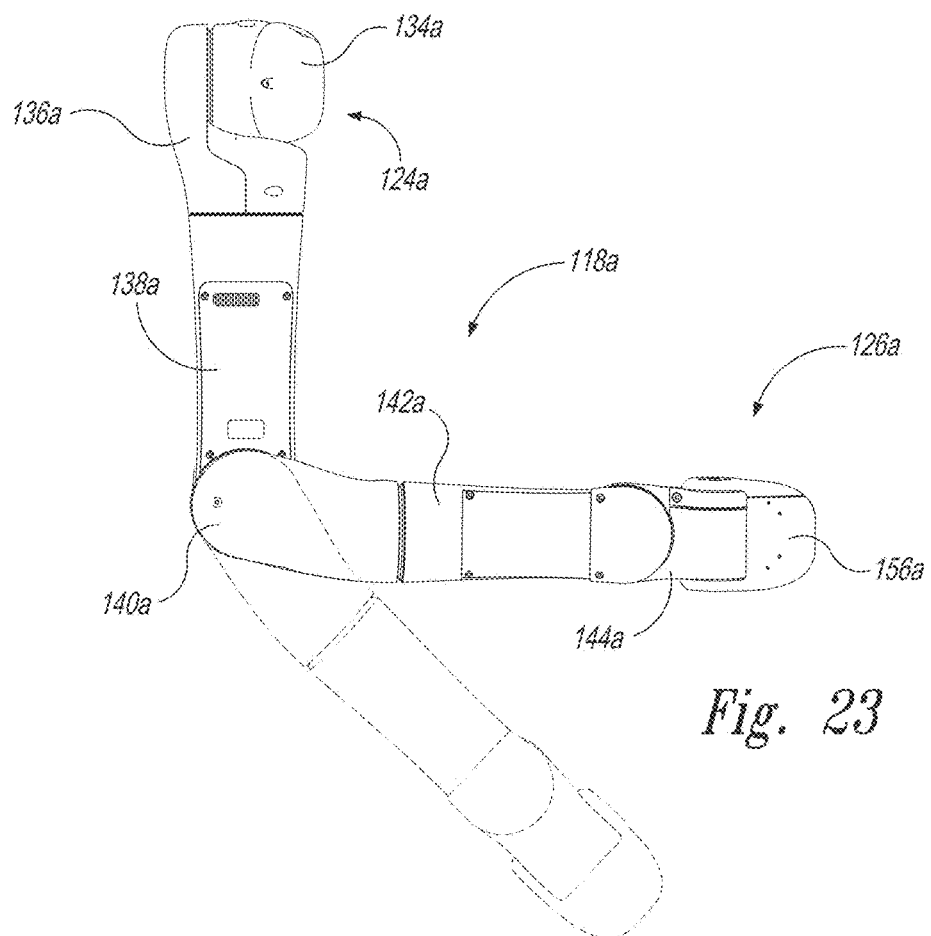
FIG. 23 is a side profile view of the first arm of the robot shown in FIG. 1 indicating isolated motion about an arm joint of the robot distal to the arm joint of FIG. 22 along the kinematic chain of FIG. 12.

FIGS. 18 and 19 are partially transparent perspective views of the legs 120*a*, 120*b*, respectively. As shown in FIGS. 18 and 19, the robot 100 can include leg actuators 176 (individually identified as leg actuators 176*a*-176*l*) as parts of the legs 120*a*, 120*b*. The leg actuators 176*a*-176*l* can be embedded within, mounted to, or otherwise carried by the links within the kinematic chains corresponding to the legs 120*a*, 120*b*. In the illustrated embodiment, the leg actuators 176*a*-176*l* are incorporated into the legs 120*a*, 120*b* in the following manner. The leg actuators 176*a*, 176*g* are embedded within portions of the proximal hip links 146*a*, 146*b* at the proximal hip joints 162*a*, 162*g*. The leg actuators 176*b*, 176*h* are embedded within portions of the proximal hip links 146*a*, 146*b* at the distal hip joints 162*b*, 162*h*. The leg actuators 176*c*, 176*i* are embedded within portions of the proximal thigh links 150*a*, 150*b* at the proximal thigh joints 162*c*, 162*i*. The leg actuators 176*d*, 176*j* are embedded within portions of the proximal thigh links 150*a*, 150*b* at the distal thigh joints 162*d*, 162*j*. The leg actuators 176*e*, 176*k* are embedded within portions of the calf links 154*a*, 154*b* spaced apart from the foot joints 162*f*, 162*l* along the corresponding leg lengths 128*a*, 128*b* and are operably connected to the foot joints 162*f*, 162*l* via the cranks 166*a*, 166*c* and the connection shafts 164*a*, 164*c*. Finally, the leg actuators 176*f*, 176*l* are embedded within portions of the calf links 154*a*, 154*b* spaced apart from the foot joints 162*f*, 162*l* and distal to the leg actuators 176*e*, 176*k* along the corresponding leg lengths 128*a*, 128*b* and are operably connected to the foot joints 162*f*, 162*l* via the cranks 166*b*, 166*d* and the connection shafts 164*b*, 164*d*.

In at least some cases, the arm actuators 174*a*-174*n* and the leg actuators 176*a*-176*l* are rotary actuators including electric servo motors and corresponding strain wave gear units. This combination can be characterized by relatively high torque density, compact size, high efficiency, and low backlash, among other potentially advantageous features. In other cases, counterparts of some or all of the arm actuators 174 and the leg actuators 176 can be pneumatic or hydraulic rather than electric, be linear rather than rotary, be stepper-type rather than servo-type, be direct drive rather than geared, and/or have gearing other than strain wave (e.g., cycloidal, spur, helical, miter, worm, rack, bevel, screw, etc.).

Figure 24:
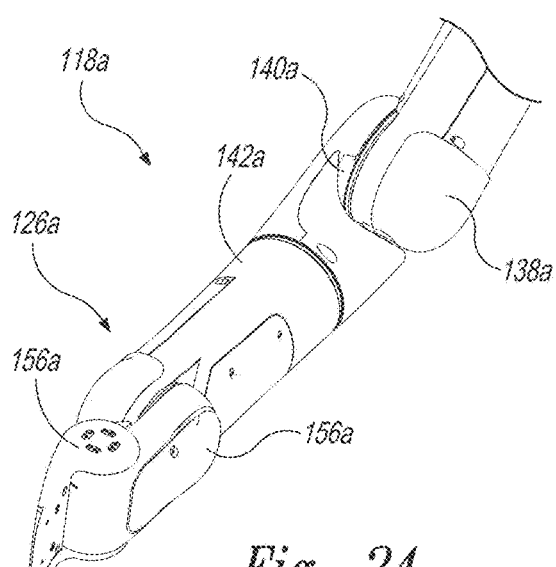
FIGS. 24 and 25 are perspective views of a distal portion of the first arm of the robot shown in FIG. 1 indicating isolated motion about an arm joint of the robot distal to the arm joint of FIG. 23 along the kinematic chain of FIG. 12.
Figure 25:
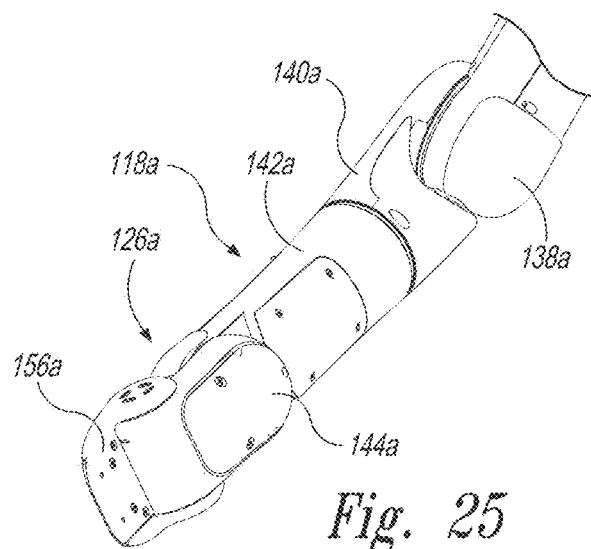
Figure 26:
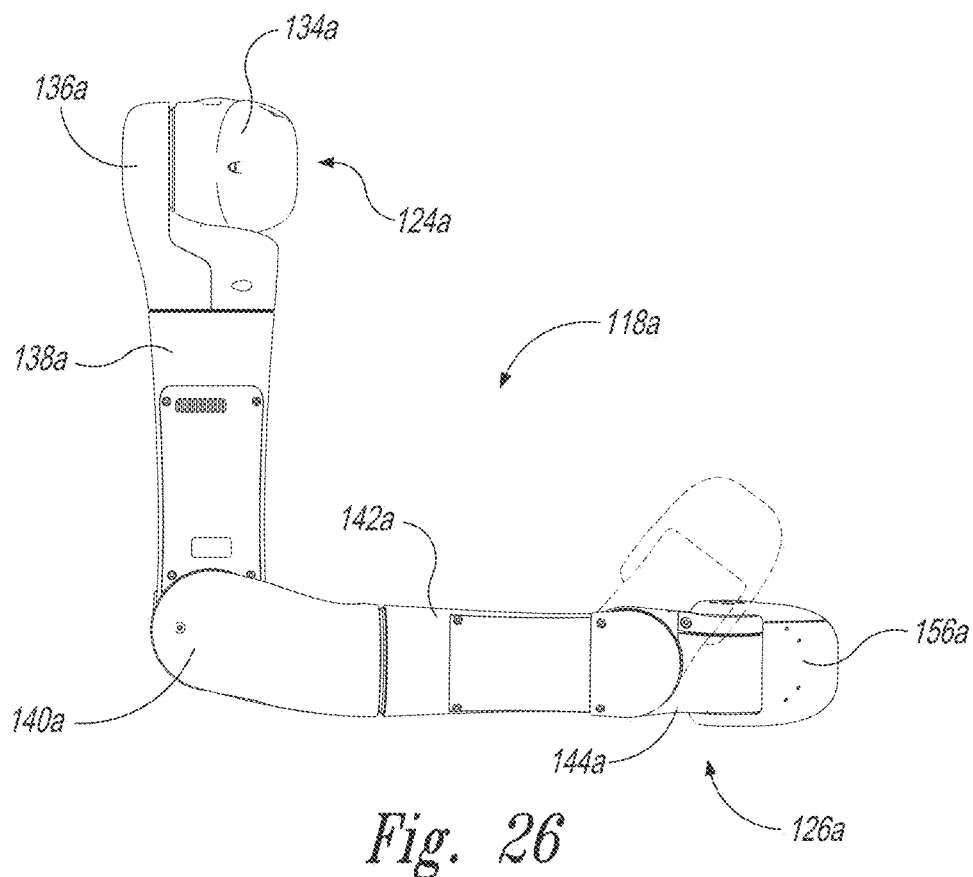
FIG. 26 is a side profile view of the first arm of the robot shown in FIG. 1 indicating isolated motion about an arm joint of the robot distal to the arm joint of FIGS. 24 and 25 along the kinematic chain of FIG. 12.
Figure 27:
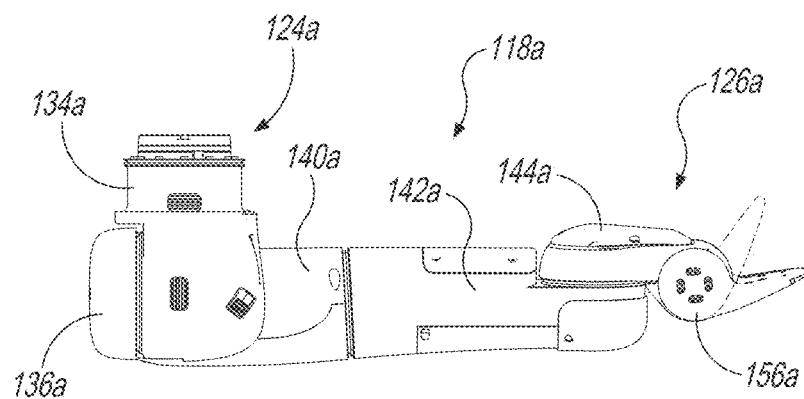
FIG. 27 is a top plan view of the first arm of the robot shown in FIG. 1 indicating isolated motion about an arm joint of the robot distal to the arm joint of FIG. 26 along the kinematic chain of FIG. 12.

FIGS. 20-23 are various views of the arm 118*a* indicating isolated motion about the proximal shoulder joint 160*a*, the distal shoulder joint 160*b*, the upper arm joint 160*c*, and the elbow joint 160*d*, respectively. FIGS. 24 and 25 are perspective views of a distal portion of the arm 118*a* indicating isolated motion about the lower arm joint 160*e*. FIGS. 26 and 27 are a side profile view and a top plan view, respectively, of the arm 118*a* indicating isolated motion about the wrist joint 160*f* and the end effector joint 160*g*, respectively. Motion about the arm joints 160*h*-160*n* of the arm 118*b* can correspond symmetrically about the midsagittal plane 102 (FIG. 3) to the motion about the arm joints 160*a*-160*g* of the arm 118*a* shown in FIGS. 20-27. In at least some cases, the proximal shoulder joints 160*a*, 160*h*, the upper arm joints 160*c*, 160*j*, and the lower arm joints 160*e*, 160*l* are configured to rotate about respective axes parallel to the corresponding arm lengths 122*a*, 122*b*. In these and other cases, the distal shoulder joints 160*b*, 160*i*, the elbow joints 160*d*, 160*k*, the wrist joints 160*f*, 160*m*, and the end effector joints 160*g*, 160*n* can be configured to rotate about respective axes off-parallel to (e.g., within 10 degrees of perpendicular to, within 5 degrees of perpendicular to and/or substantially perpendicular to) the corresponding arm lengths 122*a*, 122*b*.

Figure 28:
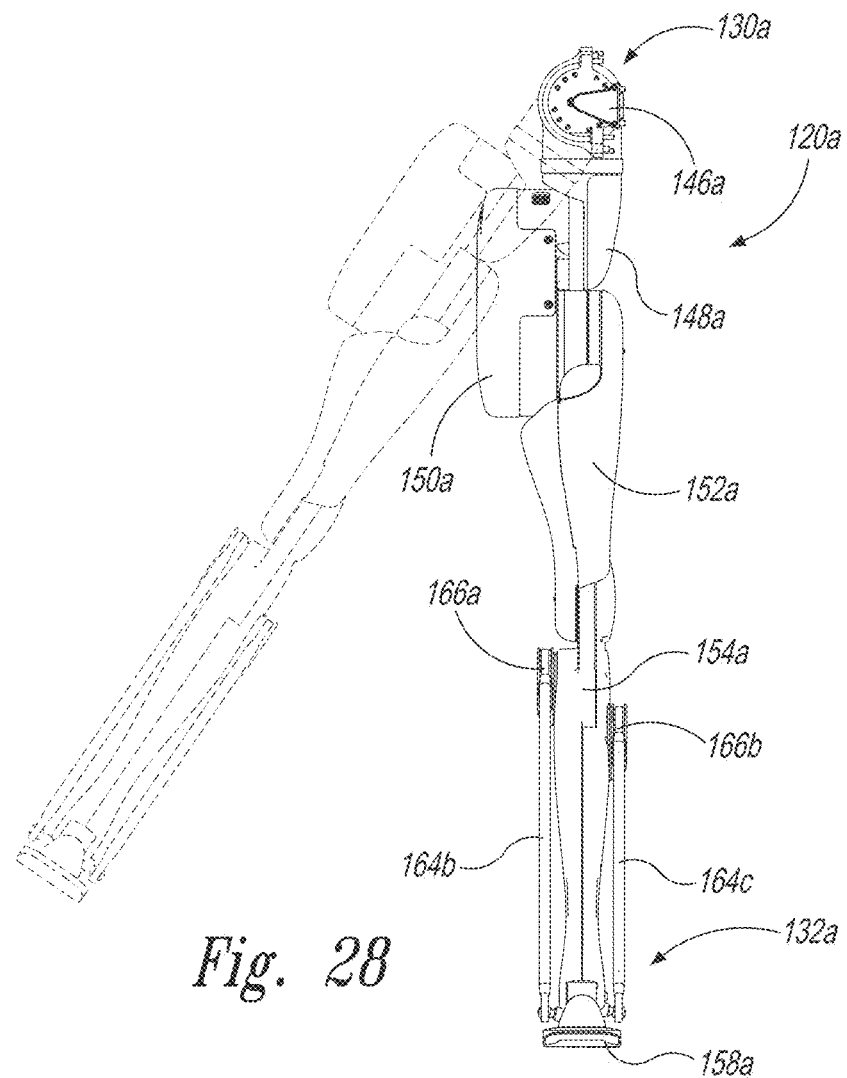
FIG. 28 is a front profile view of the first leg of the robot shown in FIG. 1 indicating isolated motion about a leg joint of the robot along the kinematic chain of FIG. 14.
Figure 29:
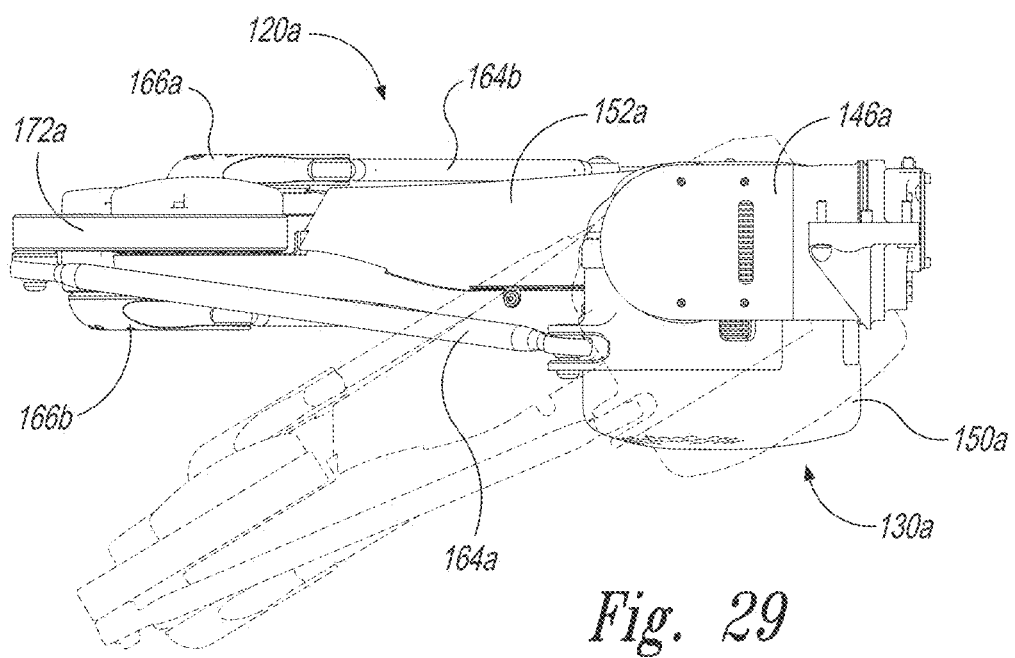
FIG. 29 is a top plan view of the first leg of the robot shown in FIG. 1 indicating isolated motion about a leg joint of the robot distal to the leg joint of FIG. 28 along the kinematic chain of FIG. 14.
Figure 30:
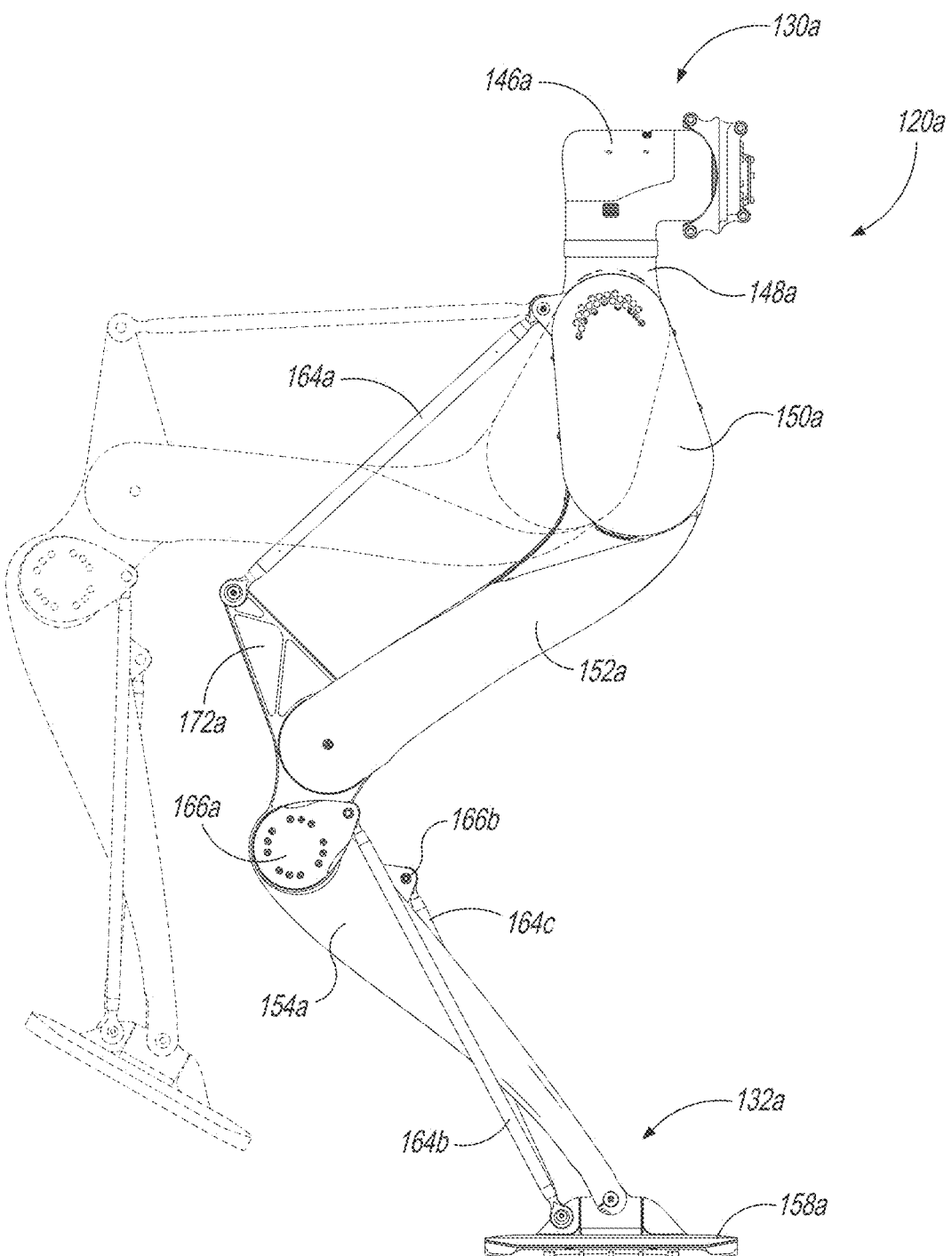
FIG. 30 is a side profile view of the first leg of the robot shown in FIG. 1 indicating isolated motion about a leg joint of the robot distal to the leg joint of FIG. 29 along the kinematic chain of FIG. 14.
Figure 31:
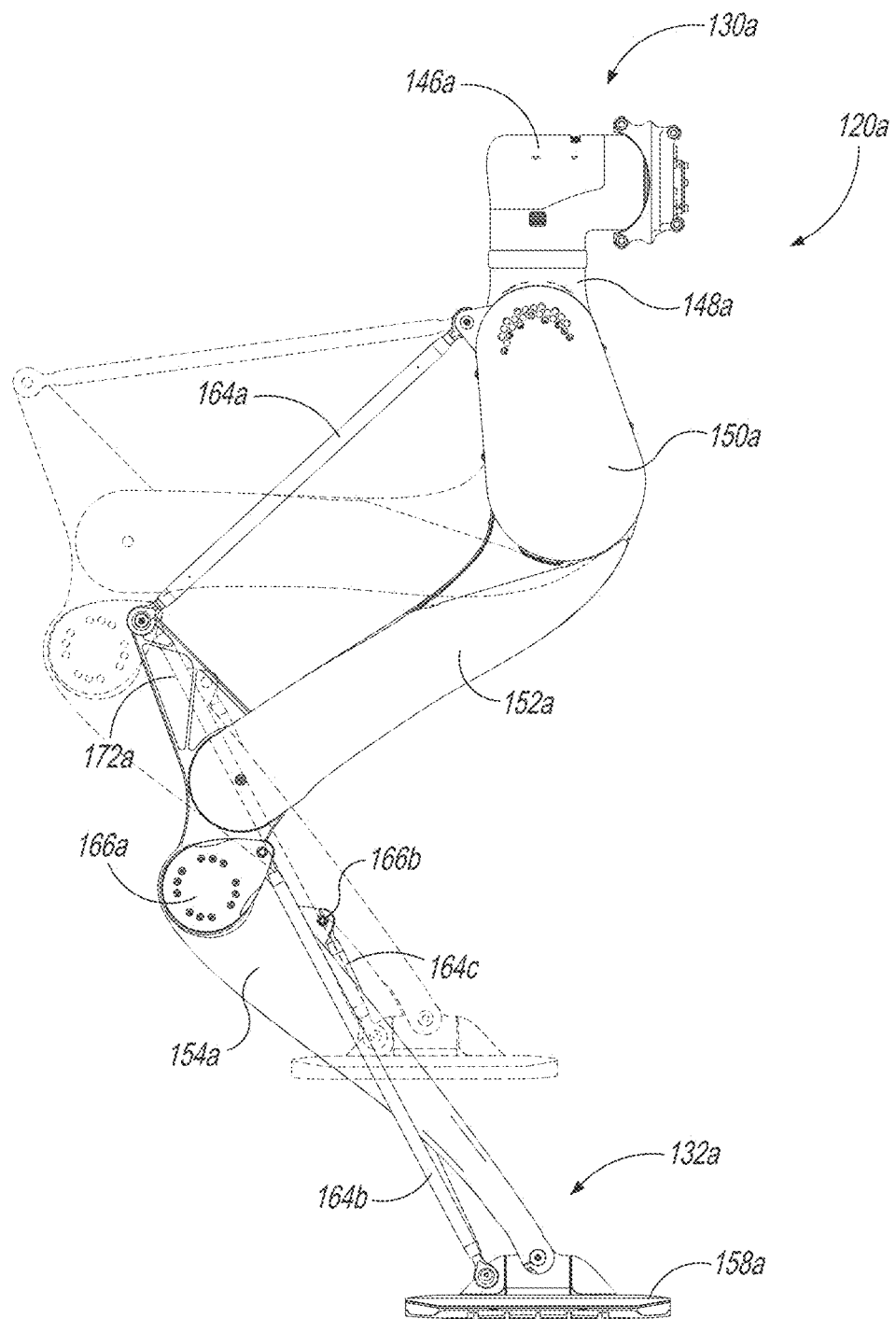
FIG. 31 is a side profile view of the first leg of the robot shown in FIG. 1 indicating isolated motion about two leg joints of the robot distal to the leg joint of FIG. 30 along the kinematic chain of FIG. 14.
Figure 32:
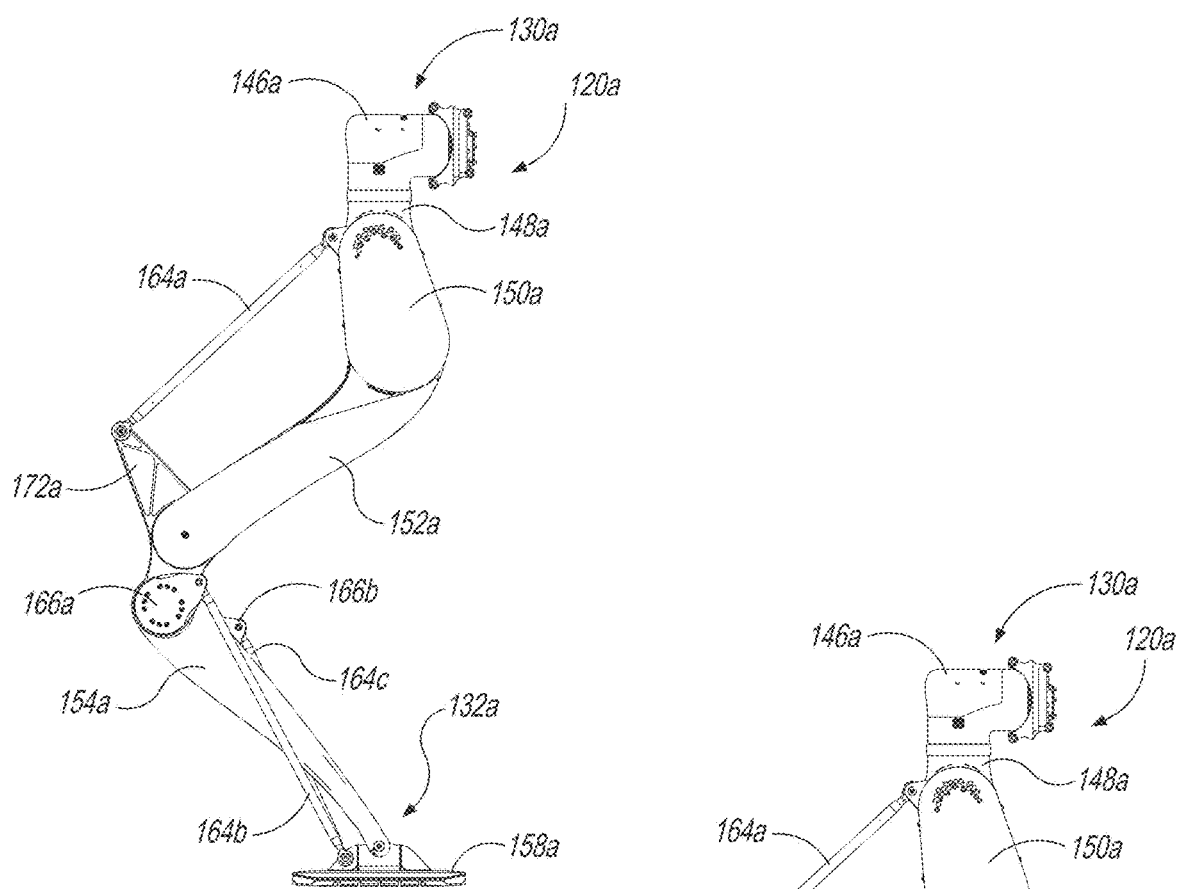
FIGS. 32 and 33 are side profile views of the first leg of the robot shown in FIG. 1 indicating isolated motion about a leg joint of the robot distal to the leg joints of FIG. 31 along the kinematic chain of FIG. 14.
Figure 33:
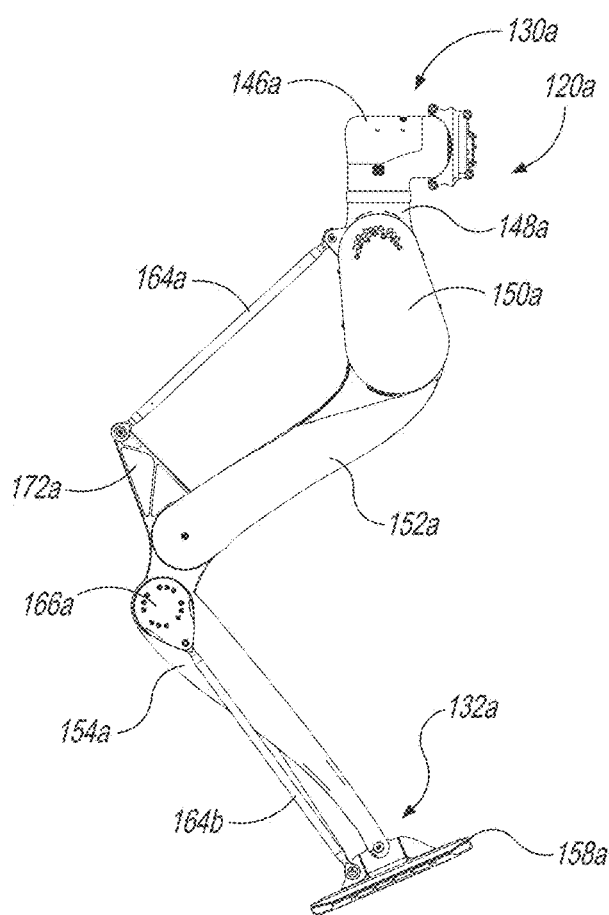

FIGS. 28-30 are various views of the leg 120*a* indicating isolated motion about the proximal hip joint 162*a*, the distal hip joint 162*b*, and the proximal thigh joint 162*c*, respectively. FIG. 31 is a side profile view of the leg 120*a* indicating isolated motion about both the distal thigh joint 162*d* and the calf joint 162*e*. FIGS. 32 and 33 are side profile views of the leg 120*a* indicating isolated motion about the foot joint 162*f*. Motion about the leg joints 162*g*-162*l* of the leg 120*b* can correspond symmetrically about the midsagittal plane 102 (FIG. 3) to the motion about the leg joints 162*a*-160*f* of the leg 120*a* shown in FIGS. 28-33. In at least some cases, the proximal hip joints 162*a*, 162*g* and the distal hip joints 162*b*, 162*h* are configured to rotate about respective axes parallel to the corresponding leg lengths 128*a*, 128*b*. In these and other cases, proximal thigh joints 162*c*, 162*i*, the distal thigh joints 162*d*, 162*j*, the calf joints 162*e*, 162*k*, and the foot joints 162*f*, 162*l* can be configured to rotate about respective axes off-parallel to (e.g., within 10 degrees of perpendicular to, within 5 degrees of perpendicular to and/or substantially perpendicular to) the corresponding leg lengths 128*a*, 128*b*.

Examples of Electrical and Computer Systems

Figure 34:
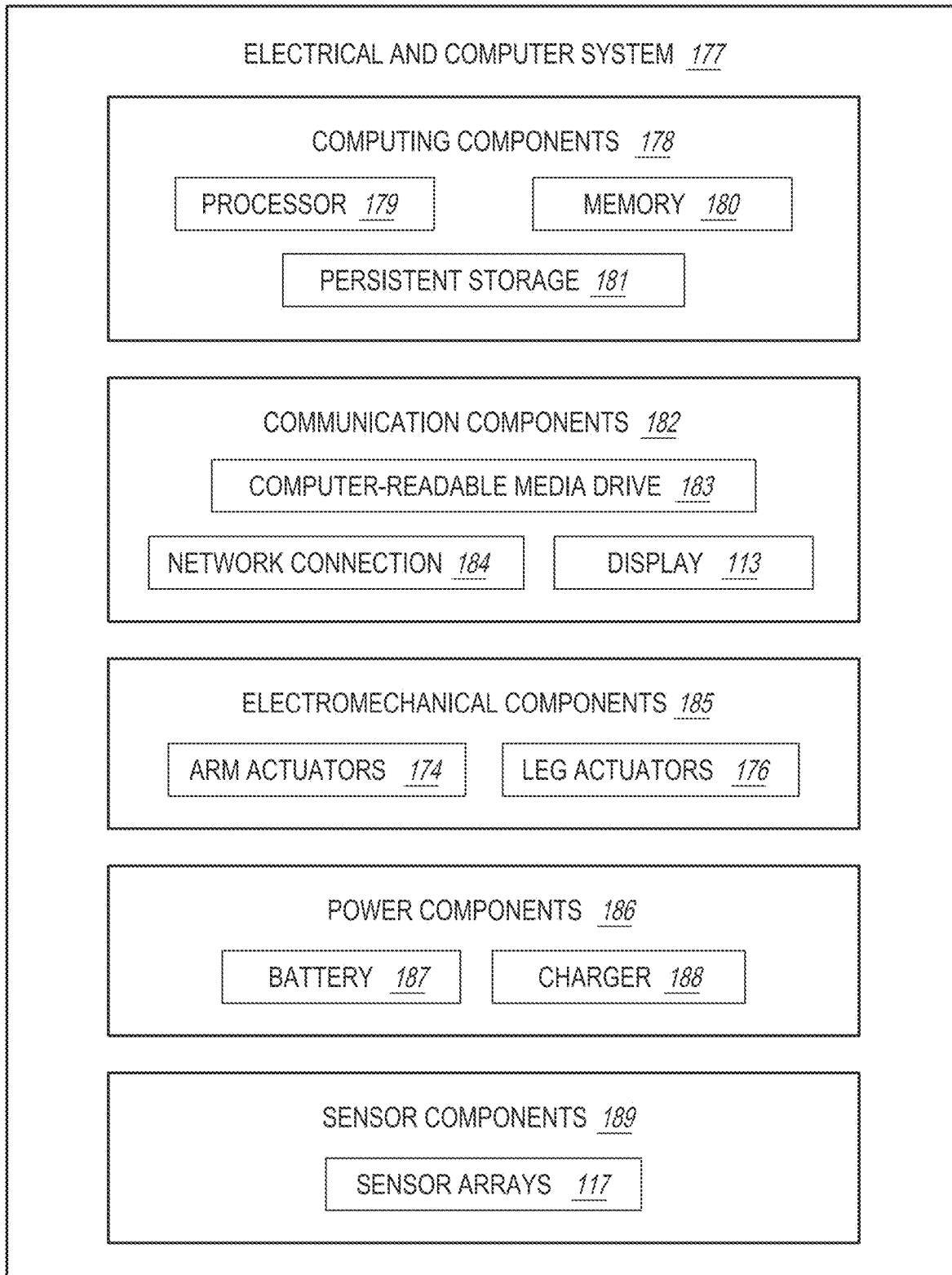
FIG. 34 is a block diagram illustrating an electrical and computer system of the robot shown in FIG. 1.

FIG. 34 is a block diagram illustrating an electrical and computer system 177 of the robot 100. When suitable, operations described elsewhere in this disclosure (e.g., movements of the robot 100) can be implemented via this electrical and computer system 177 autonomously and/or in response to instructions from a user. As shown in FIG. 34, the electrical and computer system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the electrical and computer system 177.

The electrical and computer system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLUETOOTH, WiFi, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The electrical and computer system 177 can further include electromechanical components 185. The electromechanical components 185 can include the arm actuators 174 and the leg actuators 176 discussed above and/or other suitable components for implementing mechanical action within the robot 100. The electrical and computer system 177 can further include power components 186. The power components 186 can include a battery 187 and a charger 188. The battery 187 can be a lithium-ion battery, a lead-acid battery, or another suitable type. The charger 188 can include a connector (not shown) compatible with a power source (e.g., a wall outlet) and leads (also not shown) extending between the connector and the battery 187. In at least some cases, the robot 100 is configured to operate wirelessly via the battery 187 and to recharge occasionally via the charger 188.

Finally, the electrical and computer system 177 can include sensor components 189 for capturing, providing, and/or analyzing information about the robot 100 itself and/or the environment in which the robot 100 is operating. The sensor components 189 can include the sensor arrays 117 discussed above. At the sensor arrays 117 and/or at one or more other suitable locations, the robot 100 can include among the sensor components 189 a light sensor (e.g., a photoresistor), a sound sensor (e.g., a microphone), a location sensor (e.g., using the Global Positioning System), a distance sensor, and/or a proximity sensor, among other examples. Within the body 103 and/or at one or more other suitable locations, the robot 100 can include among the sensor components 189 an accelerometer, a gyroscope, a magnetometer, and/or a tilt sensor, among other examples. At the end effectors 156*a*, 156*b* and/or at one or more other suitable locations, the robot 100 can include among the sensor components 189 a contact sensor and/or a force sensor, among other examples. In at least some cases, two or more different types of sensors are incorporated into a sensor assembly. For example, an accelerometer, a gyroscope, and a magnetometer can be incorporated into an inertial measurement unit through which the robot 100 can determine acceleration, angular velocity, and orientation.

At one, some, or all of the arm and leg actuators 174, 176 and/or at one or more other suitable locations, the robot 100 can include among the sensor components 189 sensors that measure properties of the corresponding arm and leg joints 160, 162. Such properties can include position, orientation (e.g., yaw, pitch, and roll), applied force (e.g., torque), elevation, mass, velocity, and acceleration, among other examples. The measurements of these properties can be direct or indirect. As an example, of direct sensing, the robot 100 may sense a torque acting on a given one of the arm joints 160 via a torque sensor of one of the arm actuators 174 operably associated with the arm joints 160. As an example of indirect sensing, the robot 100 may sense a position of a given one of the end effectors 156a, 156b based on perception data corresponding to the given one of the end effectors 156a, 156b and other perception data corresponding to a reference. The robot 100 can include one or more sensors in a sensor system, such as a vision system, a light detection and ranging (LIDAR) system, a sound navigation and ranging (SONAR) system, etc. In at least some cases, the robot 100 monitors itself and/or its environment in real-time or in near real-time. Moreover, the robot 100 may use acquired sensor data as a basis for decision-making via the computing components 178.

Components of the electrical and computer system 177 can be connected to one another and/or to other components of the robot 100 via suitable conductors, transmitters, receivers, circuitry, etc. While the electrical and computer system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the electrical and computer system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks or to implement particular abstract data types and may be encrypted. Furthermore, the functionality of the program modules may be combined or distributed as desired in various examples. Moreover, control scripts may be implemented in any suitable manner, such as in C/C++ or Python. The functionality of the program modules may be combined or distributed in various embodiments, including cloud-based implementations, web applications, mobile applications for mobile devices, etc.

Furthermore, certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a Local Area Network (LAN), Wide Area Network (WAN), or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave(s), etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques and that elements of the robot 100 may be distributed rather than located in a single monolithic entity. Finally, electrical and computing aspects of robots in accordance with various embodiments of the present technology may operate in environments and/or according to processes other than the environments and processes described above.

Examples of Software Architecture Related to Object Manipulation

Figure 35:
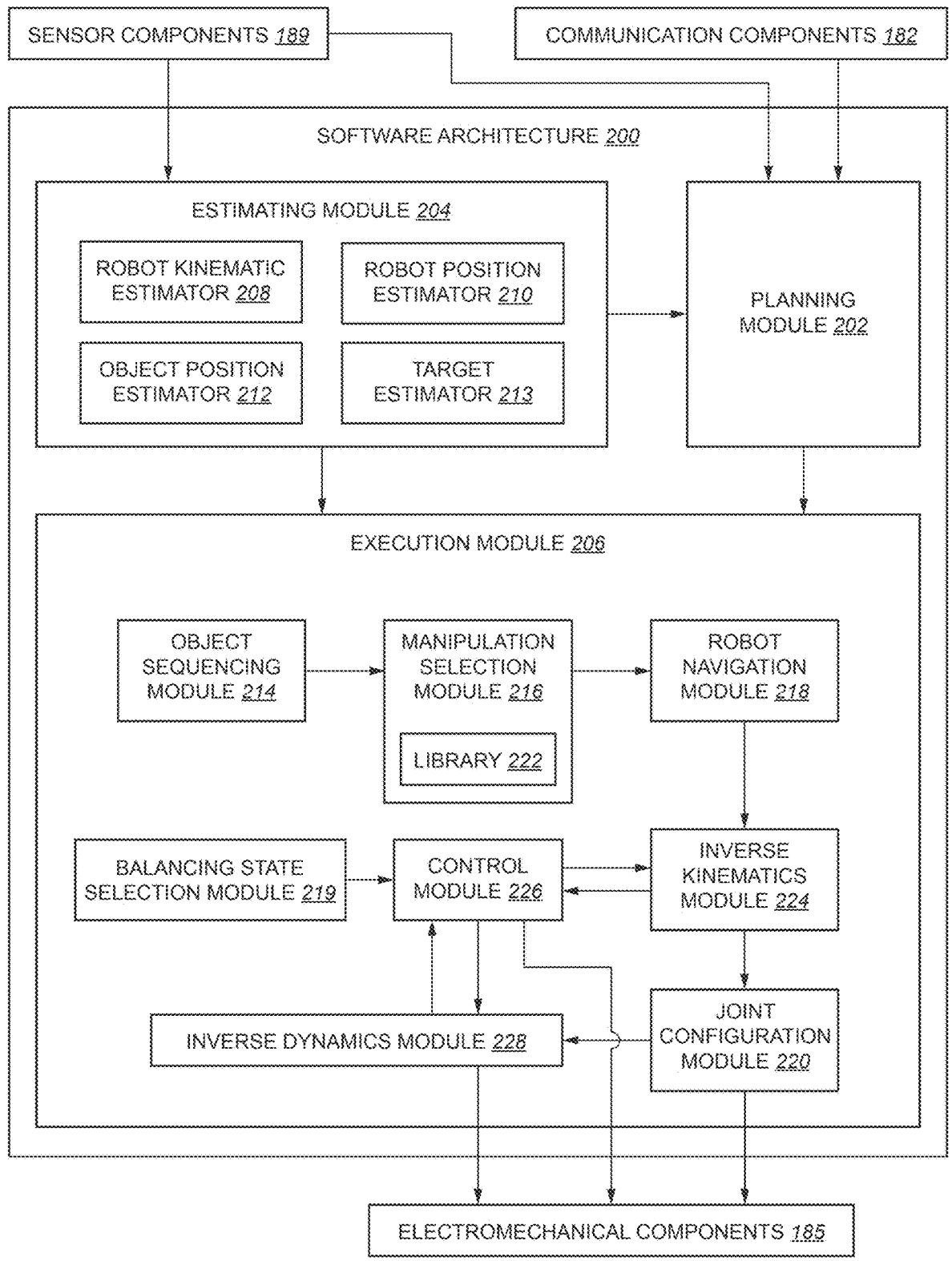
FIG. 35 is a block diagram illustrating a software architecture of the robot shown in FIG. 1.

FIG. 35 is a block diagram illustrating selected portions of a software architecture 200 of the robot 100. The software architecture 200 can be within the software features of the electrical and computer system 177 described above in connection with FIG. 34. With reference to FIGS. 34 and 35 together, the software architecture 200 can include a planning module 202, an estimating module 204, and an execution module 206 operably associated with one other. The planning module 202 can be configured to relay or to generate a plan corresponding to an objective for the robot 100 (e.g., unload all objects on a shelf, retrieve an object from a first location and move the object to a second location, etc.). In at least some cases, the planning module 202 receives information from the communication components 182 and relays or generates a plan based at least partially on the received information. For example, the planning module 202 may receive a command from a user via the communication components 182 and relay the command as a plan. As another example, the planning module 202 may receive a command from a user via the communication components 182 and generate a plan related to the command. As yet another example, the planning module 202 may generate a plan without receiving a command from a user, such as at a predetermined time or in response to information about a current state of the robot 100 or the environment received via the sensor components 189.

The estimating module 204 can receive information from the sensor components 189 and can generate estimates in real time or in near real time to inform generating and/or executing a plan. The estimating module 204 can include a robot kinematic estimator 208, a robot position estimator 210, an object position estimator 212, and a target estimator 213. The robot kinematic estimator 208 can generate an estimate of a current kinematic state of the robot 100 (e.g., balanced, off-balance, walking, standing, etc.) and estimates of positions of individual joints of the robot 100. The robot position estimator 210 can generate a current estimate of a position of the robot 100 within an environment. This position can be a set of coordinates and can be based on perception information, GPS information, and/or other information received or generated by the robot 100. Perception information potentially relevant to the position of the robot 100 includes, among other examples, information corresponding to distances between the robot 100 and landmarks in an environment and information corresponding to fiducial markings carried by or otherwise associated with the landmarks. This information can be detected, for example, via a LIDAR system of the robot 100 and/or via a camera of the robot 100. The object position estimator 212 can generate a current estimate of a position of a manipulatable object (e.g., a tote) within an environment. As with the position of the robot, the position of an object can be a set of coordinates and can be based on perception information, GPS information, and/or other information received or generated by the robot 100. Perception information potentially relevant to the position of an object includes, among other examples, information corresponding to distances between the object and the robot 100, distances between the object and landmarks in an environment, and information corresponding to fiducial markings carried by or otherwise associated with the object. This information can be detected, for example, via a LIDAR system of the robot 100 and/or via a camera of the robot 100.

The target estimator 213 can generate a target estimate of a type and/or condition of a target for retrieving or placing an object. In the case of retrieving an object, the target can be a structure (e.g., a shelf, a table, a rack, a floor, a stack, a human, another robot, etc.) carrying the object and/or an environment immediately surrounding the object. Similarly, in the case of placing an object, the target can be a structure (e.g., a shelf, a table, a rack, a floor, a stack, a human, another robot, etc.) intended to receive the object and/or an environment immediately surrounding an intended destination for the object. The target estimate can be based at least partially on perception information. Perception information potentially relevant to the target estimate can include point cloud data corresponding to a target as detected, for example, via a LIDAR system of the robot 100. As another example, relevant perception information can include an image of a target as detected, for example, via a camera of the robot 100.

The target estimator 213 can be configured to interpret data corresponding to a target and thereby generate useful information about the target. For example, the target estimator 213 can receive point cloud, image, or other data corresponding to a region above a surface of a table intended to receive an object. This data can include data corresponding to an object on the table. The target estimator 213 can then determine based on the data corresponding to the object that a peripheral obstruction is present at the table. Alternatively, the target estimator 213 can interpret an absence of point cloud, image, or other data corresponding to an object on the table as an indication that no peripheral obstruction is present at the table. Furthermore, the target estimator 213 can be configured to recognize a type (e.g., a class) of a target. In at least some cases, the target estimator 213 includes a convolutional neural network for such interpretation. The convolutional neural network can be trained on images of structure types (e.g. shelves, tables, racks, floors, stacks, humans, other robots, etc.) typical of targets for retrieving or placing objects.

The execution module 206 can be configured to receive a plan from the planning module 202 and estimates from the estimating module 204. The execution module 206 can include an object sequencing module 214, a manipulation selection module 216, a robot navigation module 218, a balancing state selection module 219, and a joint configuration module 220. The planning module 202 can be configured to send a plan to the object sequencing module 214, to the manipulation selection module 216, to the robot navigation module 218, or to the joint configuration module 220 based on attributes of the plan. For example, when a plan includes explicit instructions for positions of the electromechanical components 185, the planning module 202 can send the plan to the execution module 206 via the joint configuration module 220. As another example, when a plan does not involve manipulating an object, the planning module 202 can send the plan to the execution module 206 via the robot navigation module 218. As yet another example, when a plan concerns only one object and the object is remote to the robot 100, the planning module 202 can send the plan to the execution module 206 via the manipulation selection module 216. As a final example, when a plan concerns multiple objects remote to the robot 100, the planning module 202 can send the plan to the execution module 206 via the object sequencing module 214.

The object sequencing module 214 can receive one or more estimates from the estimating module 204 and can generate a sequence in which multiple objects are to be manipulated. For example, when the object sequencing module 214 receives a plan to unload a shelf, the object sequencing module 214 can query the estimating module 204 for current locations of objects on the shelf. The object sequencing module 214 can then assign the objects an order, convert the order into a queue, and pass the queue to the manipulation selection module 216. The manipulation selection module 216 can include a library 222 including two or more different motion sequences that can be used to manipulate an object. The manipulation selection module 216 can select a motion sequence for a given object based on information, such as information about the object and/or information about the environment. The robot navigation module 218 can generate targets for different parts of the robot 100 further to a plan or to a portion of a plan being executed. Examples of targets include positions of the feet 158a, 158b in the environment, positions of the end effectors 156a, 156b in the environment, etc. The robot navigation module 218 can update these targets continuously or near continuously based on information from the estimating module 204. The execution module 206 can further include an inverse kinematics module 224 that translates the targets from the robot navigation module 218 into joint configurations throughout the robot 100.

The balancing state selection module 219 can select a balancing state for retrieving or placing an object based on information about a target for retrieving or placing the object. For example, if a target for placing an object is crowded (e.g., due to the presence of peripheral obstructions at the target) the balancing state selection module 219 can select a standing balancing state for placing the object. This can be useful to enhance the precision of the placement, to reduce the possibility of displacing and/or damaging peripheral objects at the target, and/or for one or more other reasons. In contrast, if a target for placing an object is uncrowded (e.g., due to the absence of peripheral obstructions at the target) the balancing state selection module 219 can select a non-standing balancing state for placing the object. This can be useful to enhance the efficiency and/or reliability of the placement and/or for one or more other reasons.

The execution module 206 can also include a control module 226 that receives joint configurations from the inverse kinematics module 224 and generates joint parameters (e.g., positions, velocities, accelerations, etc.) to be executed by the robot 100 to achieve these joint configurations. Through continuous or near-continuous communication with the inverse kinematics module 224, the control module 226 can modify the joint parameters to at least partially compensate for deviations as the robot 100 executes the joint configurations. The inverse kinematics module 224 can send other joint configurations not subject to active control to the joint configuration module 220. Similar to the control module 226, the joint configuration module 220 can generate joint parameters (e.g., positions, velocities, accelerations, etc.) to be executed by the robot 100 to achieve joint configurations received from the inverse kinematics module 224 or from the planning module 202. The control module 226 can also receive a balancing state from the balancing state selection module 219. Based at least partially on the balancing state, the control module 226 can selectively apply constraints on joint parameters available to compensate for deviations as the robot 100 executes the joint configurations. For example, when the balancing state selection module 219 selects a standing balancing state for placing an object, the control module 226 can apply a constraint that excludes compensations that involve moving the feet 158a, 158b.

Finally, the execution module 206 can include an inverse dynamics module 228 that receives joint parameters from the control module 226 and from the joint configuration module 220. The inverse dynamics module 228 can track a desired wrench of the robot 100 and its relationship with objects in the environment. In at least some cases, the inverse dynamics module 228 references a map of robot positions and wrenches to joint torques. Based at least partially on the tracking, the inverse dynamics module 228 can modify the joint parameters to achieve a desired result. For example, the inverse dynamics module 228 can modify the joint parameters to maintain contact between the end effectors 156a, 156b and an object as the robot 100 carries the object. The inverse dynamics module 228 can then send modified joint parameters to the electromechanical components 185 for execution. For configurations that do not involve a dynamic interaction with the environment, the control module 226 and the joint configuration module 220 can send joint parameters directly to the electromechanical components 185 for execution.

Examples of Methods

Figure 36:
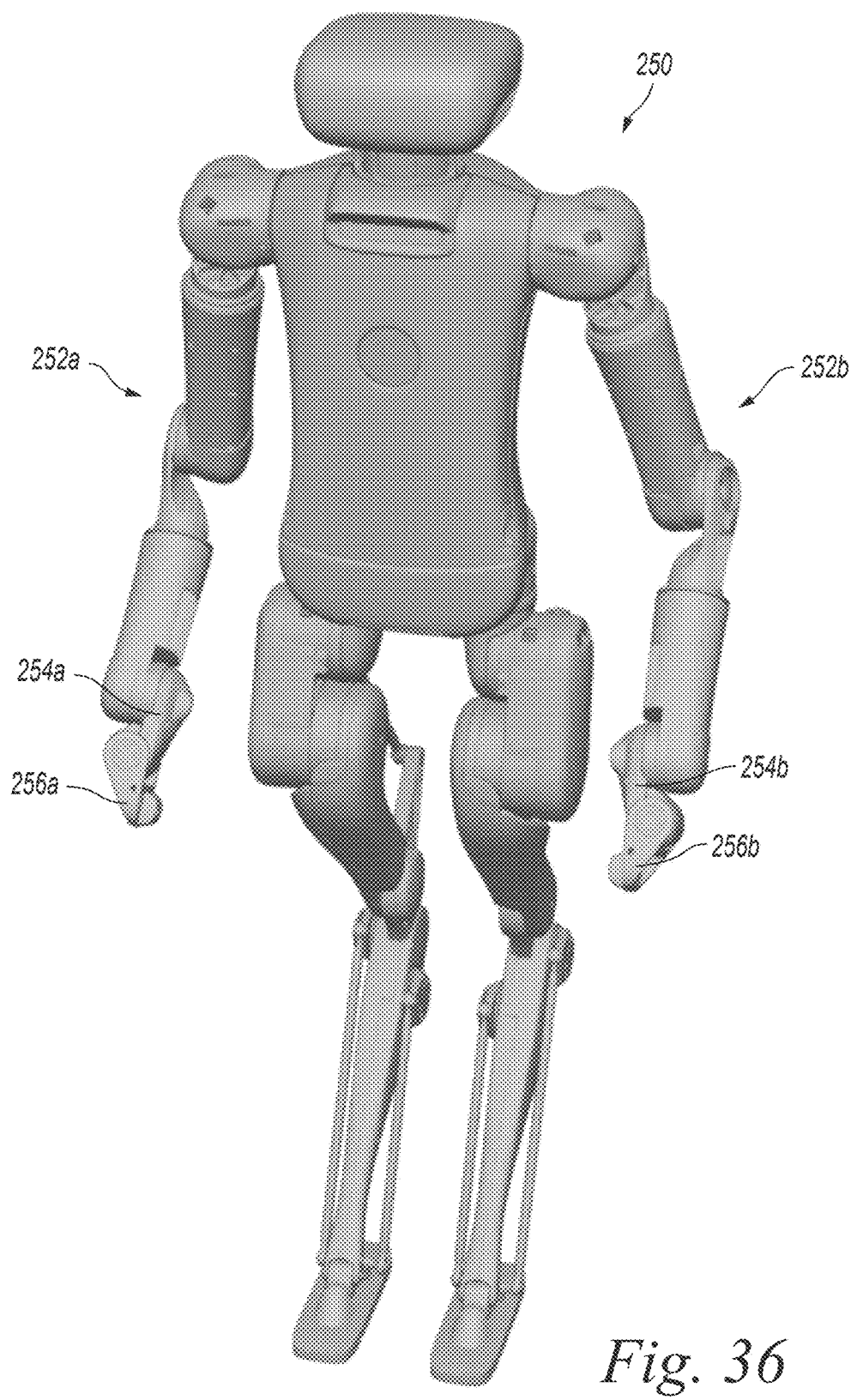
FIG. 36 is a perspective view of a robot in accordance with at least some embodiments of the present technology.

Methods in accordance with at least some embodiments of the present technology may be described in this section in the context of a robot 250 as shown in FIG. 36. With reference to FIGS. 1 and 36, the robot 250 can include arms 252a, 252b corresponding, respectively, to the arms 118a, 118b of the robot 100. With reference to FIGS. 1, 4, 5 and 36 together, the arm 252a of the robot 250 can include a wrist link 254a and an end effector 256a corresponding, respectively, to the wrist link 144a and the end effector 156a of the arm 118a of the robot 100. Similarly, the arm 252b of the robot 250 can include a wrist link 254b and an end effector 256b corresponding, respectively, to the wrist link 144b and the end effector 156b of the arm 118b of the robot 100. Aside from the wrist links 254a, 254b, the end effectors 256a, 256b, and associated features, the robot 250 can be the same as or similar to the robot 100. Accordingly, reference numbers introduced in the context of the robot 100 may be used to identify corresponding features of the robot 250.

Figure 37:
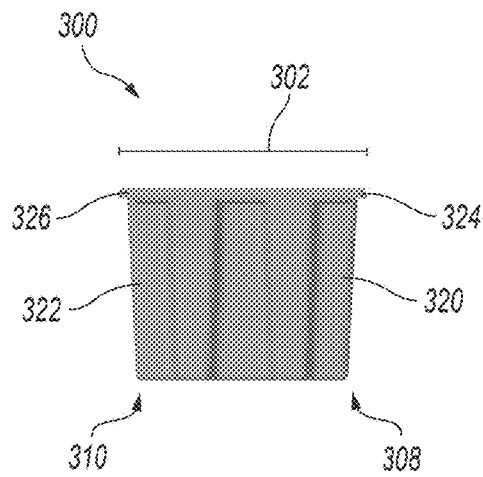
FIG. 37 is a front profile view of an object.
Figure 38:
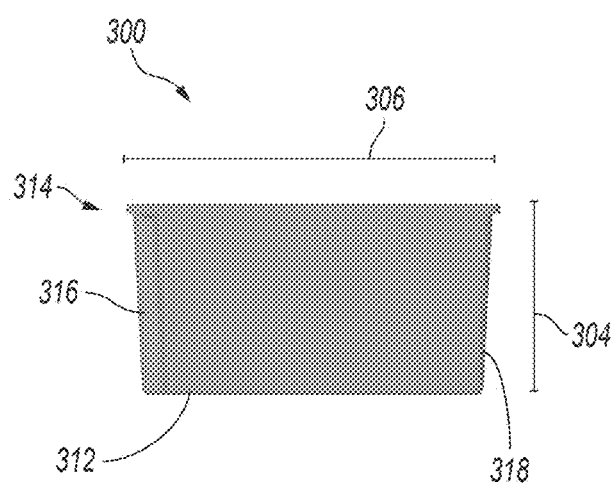
FIG. 38 is a side profile view of the object shown in FIG. 37.

Methods in accordance with at least some embodiments of the present technology may be described in this section in the context of an object 300 as shown in FIGS. 37 and 38. With reference to FIGS. 37 and 38, the object 300 can define an object width 302, an object height 304, and an object depth 306 perpendicular to one another. The object 300 can include a first side portion 308 and a second side portion 310 spaced apart from one another along the object width 302. The object 300 can further include a bottom portion 312 and a top portion 314 spaced apart from one another along the object height 304. The object 300 can also include a front portion 316 and a rear portion 318 spaced apart from one another along the object depth 306. As parts of the first and second side portions 308, 310, the object 300 can include first and second sidewalls 320, 322, respectively, and first and second protrusions 324, 326, respectively. The first and second protrusions 324, 326 can extend laterally outward from the first and second sidewalls 320, 322, respectively. The first and second sidewalls 320, 322 can taper inwardly from the top portion 314 of the object 300 toward the bottom portion 312 of the object 300. Correspondingly, the object width 302 can decrease from the top portion 314 of the object 300 toward the bottom portion 312 of the object 300 along the object height 304. In the illustrated case, the object 300 is an open tote. The top portion 314 of the object 300 can be a lidless rim defining an opening through which the object 300 can be loaded and unloaded. In other cases, a counterpart of the object 300 can have another suitable form. For example, a counterpart of the object 300 can be a box, an unpackaged hardgood, or a tote having a different form.

Figure 39:
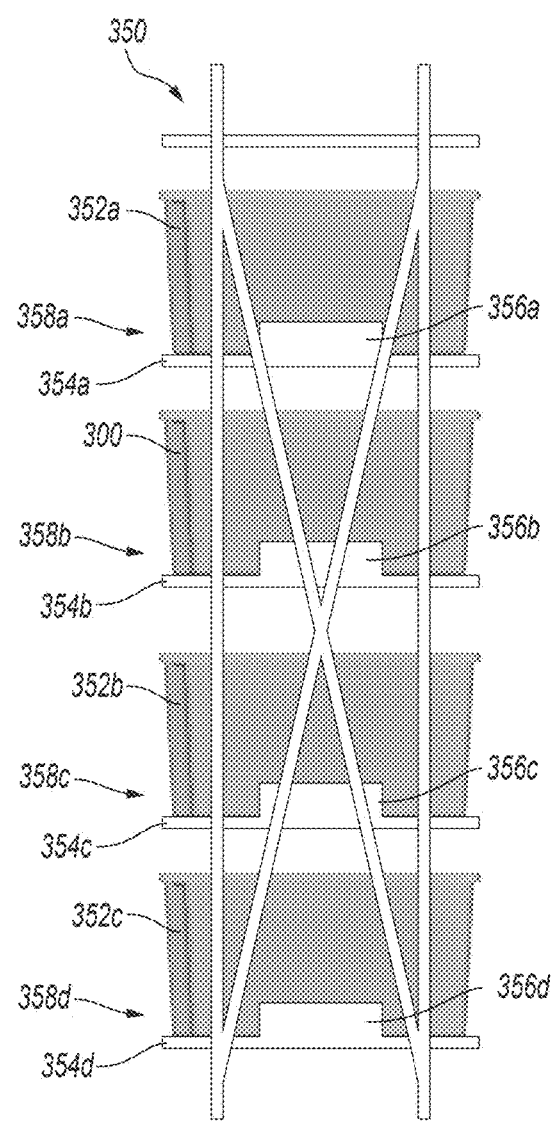
FIG. 39 is a side profile view of a support structure carrying the object shown in FIG. 37 and additional objects.

Methods in accordance with at least some embodiments of the present technology may be described in this section in the context of a support structure 350 as shown in FIG. 39. The support structure 350 can carry the object 300 and additional objects 352 (individually identified as additional objects 352a-352c). The support structure 350 can include vertically distributed tiers 354 (individually identified as tiers 354a-354d). At the respective tiers 354a-354d, the support structure 350 can include sidewalls 356 (individually identified as sidewalls 356a-356d) and additional sidewalls (not shown) laterally spaced apart from the respective sidewalls 356a-356d in a direction perpendicular to the page. Between the respective pairs of the sidewalls 356a-356d and the corresponding additional sidewalls, the support structure 350 can define respective bays (individually identified as bays 358a-358d). The sidewalls 356a-356d and the corresponding additional sidewalls can channelize the bays 358a-358d. The support structure 350 can carry the object 300 at the bay 358b and the additional objects 352a-352c at the bays 358a, 358c, 358d, respectively. In this state, the sidewalls 356a-356d and the corresponding additional sidewalls can restrict lateral movement of the object 300 and the additional objects 352a-352c. In the illustrated case, the support structure 350 is a shelving unit. In other cases, a counterpart of the support structure 350 can have another suitable form, such as another suitable form in which the lateral movement of objects carried by the support structure is at least partially restricted. For example, a counterpart of the support structure 350 can be a rack, a cubby wall, a close-packed bundle of objects, etc.

Figure 40:
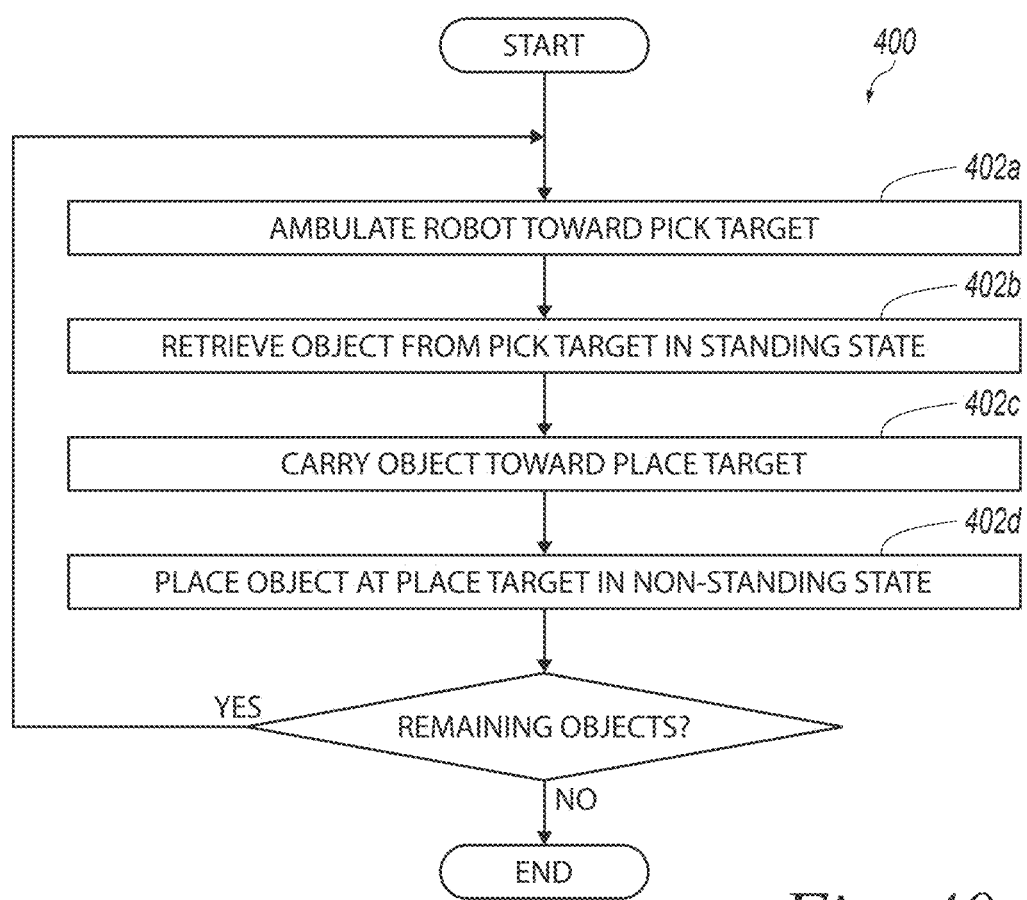
FIG. 40 is a block diagram corresponding to a method in accordance with at least some embodiments of the present technology.

FIG. 40 is a block diagram corresponding to a method 400 in accordance with at least some embodiments of the present technology. The diagram includes blocks 402a-402d corresponding to different respective portions of the method 400. FIGS. 41-46 are side profile views of the robot 250, the object 300, and associated structures at different respective times during an embodiment of the method 400. Although the method 400 is shown and described primarily in the context of the robot 250 and the object 300, the method 400 can alternatively be implemented in other contexts, such as in connection with any of the counterparts described herein. With reference now to FIGS. 1-46 together, the method 400 can include ambulating the robot 250 toward a pick target (block 402a). For example, the robot 250 can move along a floor surface 450 toward the pick target via the legs 120a, 120b (e.g., bipedally). In the illustrated case, the pick target is the bay 358b defined by the support structure 350. As discussed above in connection with FIG. 39, the object 300 can be positionally constrained at the pick target by the sidewall 356b and the corresponding additional sidewall. In at least some cases, the pick target registers the object 300 in a predetermined position.

Figure 41:
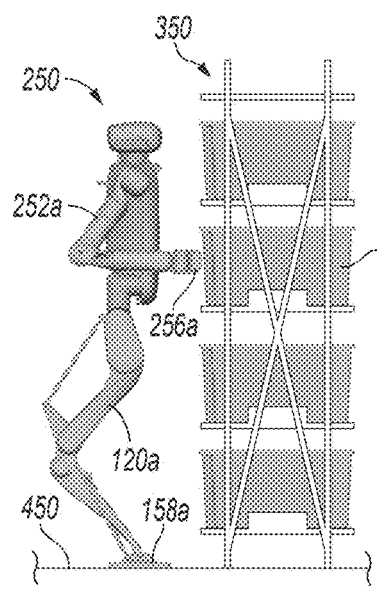
FIGS. 41-43 are side profile views of the robot shown in FIG. 36, the object shown in FIG. 37, and the support structure and additional objects shown in FIG. 39 at different respective times while the robot retrieves the object during an embodiment of the method of FIG. 39.
Figure 42:
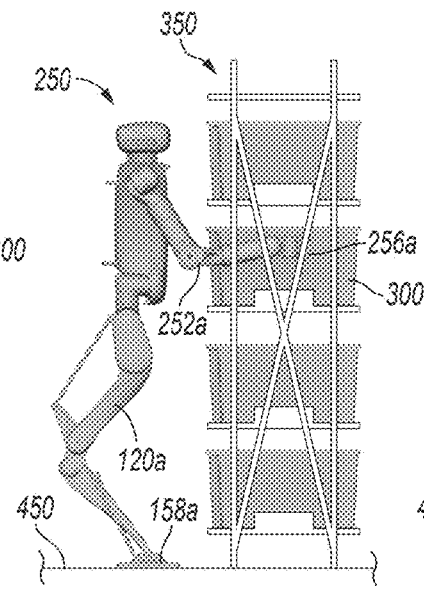
Figure 43:
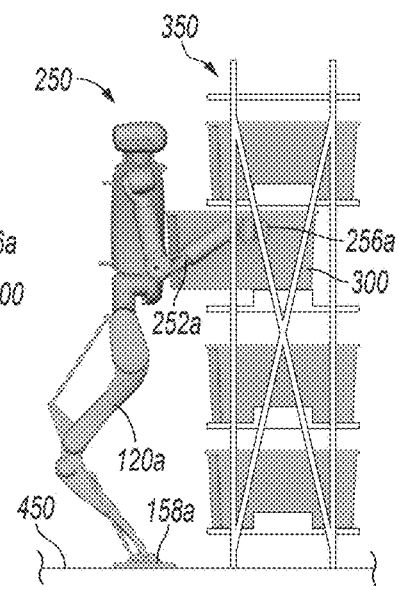

The method 400 can further include retrieving the object 300 from the pick target while the robot 250 is in a standing state (block 402b). This can occur after the robot 250 moves toward the pick target. FIGS. 41-43 are side profile views of the robot 250, the object 300, and associated structures at different respective times while the robot 250 retrieves the object 300 during an embodiment of the method 400. In particular, FIG. 41 shows the robot 250 in a pre-contact pose ready to retrieve the object 300. In the pre-contact pose, the upper arm links 138a, 138b can extend posteriorly and inferiorly along the corresponding arm lengths 122a, 122b. Also in the pre-contact pose, the lower arm links 142a, 142b can extend anteriorly along the corresponding arm lengths 122a, 122b. Also in the pre-contact pose, the legs 120a, 120b can be bent to a degree that generally aligns the end effectors 256a, 256b vertically with portions of the object 300 to be contacted. FIG. 42 shows the robot 250 with the arms 252a, 252b extended immediately after the arms 252a, 252b contact the object 300. The arms 252a, 252b can contact the object 300 at respective interfaces spaced apart from one another along the object width 302. As shown in FIG. 43, after contacting the object 300, the robot 250 can move the object 300 toward the body 103 via the arms 252a, 252b while the arms 252a, 252b are in contact with the object 300 at the respective interfaces.

While retrieving the object 300, such as during the operations shown in FIGS. 41-43, the robot 250 can be in a dynamic balancing state in which the robot 250 maintains its balance while the feet 158a, 158b are planted on the floor surface 450. This state may alternatively be referred to herein as a standing state. When the robot 250 is in the standing state, the control module 226 can balance the robot 250 via movements of various combinations of the arm joints 160a-160n and the leg joints 162a-162l that do not cause the feet 158a, 158b to move out of contact with the floor surface 450. In this state, the body 103 may sway, but tends not to move significantly. This can enhance the precision of movement of the arms 252a, 252b relative to the object 300, relative to the support structure 350, and relative to other structures in the environment. Such precision can be useful when the positions of the interfaces between the arms 252a, 252b and the object 300 have operational significance. For example, a counterpart of the object 300 may include handles that define relatively small surfaces through which the object 300 can be grasped effectively. In addition or alternatively, precise movement of the arms 252a, 252b can be advantageous when space neighboring the object 300 is limited, such as by laterally adjacent objects, by fixed portions of the support structure 350, etc.

Figure 44:
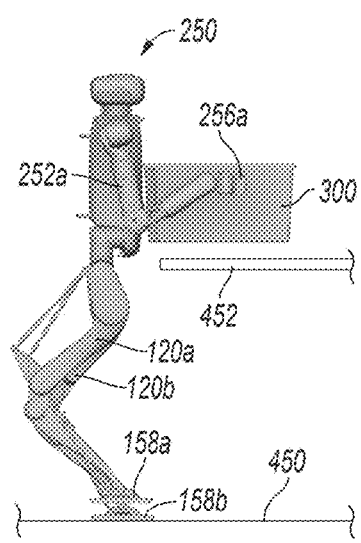
FIGS. 44-46 are side profile views of the robot shown in FIG. 36, the object shown in FIG. 37, and a table at different respective times while the robot places the object during an embodiment of the method of FIG. 39.
Figure 45:
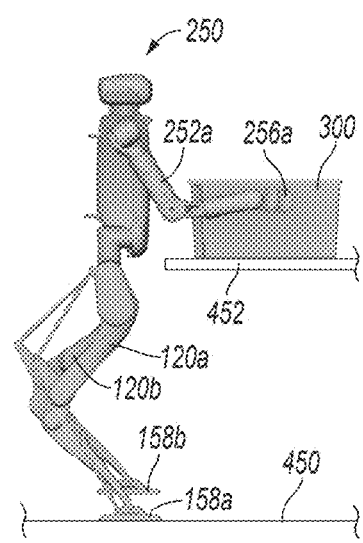
Figure 46:
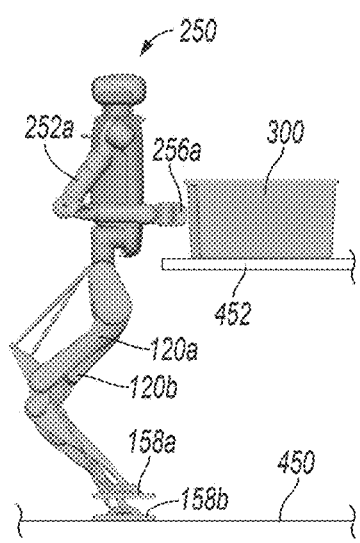

After retrieving the object 300, the method 400 can include carrying the object 300 toward a place target by the robot 250 (block 402c). The place target can be spaced apart from the pick target in a working environment. In at least some cases, the robot 250 carries the object 300 while ambulating via the legs 120a, 120b over the floor surface 450 (e.g., bipedally). Furthermore, the robot 250 can carry the object 300 while the arms 252a, 252b are in contact with the object 300 at respective interfaces spaced apart from one another along the object width 302. After carrying the object 300, the method 400 can include placing the object 300 at the place target while the robot 250 is in a non-standing state (block 402b). FIGS. 44-46 are side profile views of the robot 250, the object 300, and associated structures at different respective times while the robot 250 places the object 300 during an embodiment of the method 400. In particular, FIG. 44 shows the robot 250 in a carrying pose ready to place the object 300. In the carrying pose, the object 300 can be in contact with or otherwise proximate to an anterior surface of the torso 104. Placing the object 300 can include moving the object 300 away from the body 103 via the arms 252a, 252b. FIG. 45 shows the robot 250 with the arms 252a, 252b extended immediately after the object 300 contacts the support structure 350. As shown in FIG. 46, once support for the object 300 transfers to the support structure 350, the robot 250 can release contact between the arms 252a, 252b and the object 300 and retract the arms 252a, 252b.

While placing the object 300, such as during the operations shown in FIGS. 44-46, the robot 250 can be in a dynamic balancing state in which the robot 250 maintains its balance while at least one of the feet 158a, 158b moves relative to the floor surface 450. This state may alternatively be referred herein to as a non-standing state or as a walking state. When the robot 250 is in the non-standing state, the control module 226 can balance the robot 250 via movements of various combinations of the arm joints 160a-160n and the leg joints 162a-162l including those that cause the feet 158a, 158b to move out of contact with the floor surface 450. As shown in FIGS. 44-46, the robot 250 in the non-standing state may walk in place or otherwise shuffle the feet 158a, 158b without significantly changing respective touchdown locations for the feet 158a, 158b. In other cases, the robot 250 in the non-standing state may walk forward and backward, side-to-side, in a circle, etc. within a relatively small region of the floor surface 450. In still other cases, the non-standing state can be a continuation of a preceding walking state in which the robot 250 has a forward trajectory. This forward trajectory can be maintained or modified (e.g., slowed) as the robot 250 approaches the place target. In addition or alternatively, the non-standing state can be one in which the robot 250 changes its trajectory without coming to a stop. For example, the robot 250 may move toward and away from the place target in a continuous curved trajectory while placing the object 300.

The body 103 may move significantly when the robot 250 is in the non-standing state even if the navigation target for the overall robot 250 remains steady. Relatedly, the precision with which the robot 250 moves the arms 252a, 252b may be significantly lower when the robot 250 is in the non-standing than when the robot 250 is in the standing state. As discussed above, however, a non-standing state can also have advantages over a standing state. Moreover, the precision afforded by transitioning the robot 250 from a non-standing state to a standing state may be unnecessary in many circumstances. In the illustrated case, the place target is an empty table 452. In this case and others, the position of the object 300 after placement may be inconsequential. For example, a broader protocol for the object 300 may involve a human retrieving the object 300 from the place target after the robot 250 places the object 300. The precision of the placement may make little or no difference to the human in such a protocol. Furthermore, the place target may be conformally adaptive to a position of the object 300 to a greater extent than the pick target is conformally adaptive to a position of the object 300. In other words, the object 300 may have a level of positional constraint at the pick target immediately before retrieval and a lesser level of positional constraint at the place target immediately after placement. For example, the place target can include no or fewer structures corresponding to the sidewall 356b and the corresponding additional sidewall of the support structure 350. As another example, precise positioning of the object 300 during and after placement may be relatively unimportant when the place target is a direct human recipient in an object handoff.

After placing the object 300, the method 400 can repeat for additional objects. In these repetitions, the respective balancing states for retrieving and placing can be the same as or different from the states described above in connection with FIGS. 41-46. In one example, the robot 250 retrieves the object 300 in a standing state, places the object 300 in a non-standing state, retrieves a subsequent object in a standing state, and places the subsequent object in a non-standing state. In another example, the robot 250 retrieves the object 300 in a standing state, places the object 300 in a non-standing state, retrieves a subsequent object in a non-standing state, and places the subsequent object in a standing state. In another example, the robot 250 retrieves the object 300 in a standing state, places the object 300 in a non-standing state, retrieves a subsequent object in a non-standing state, and places the subsequent object in a non-standing state. In yet another example, the robot 250 retrieves the object 300 in a standing state, places the object 300 in a non-standing state, retrieves a subsequent object in a standing state, and places the subsequent object in a standing state. Other permutations are also possible.

Figure 47:
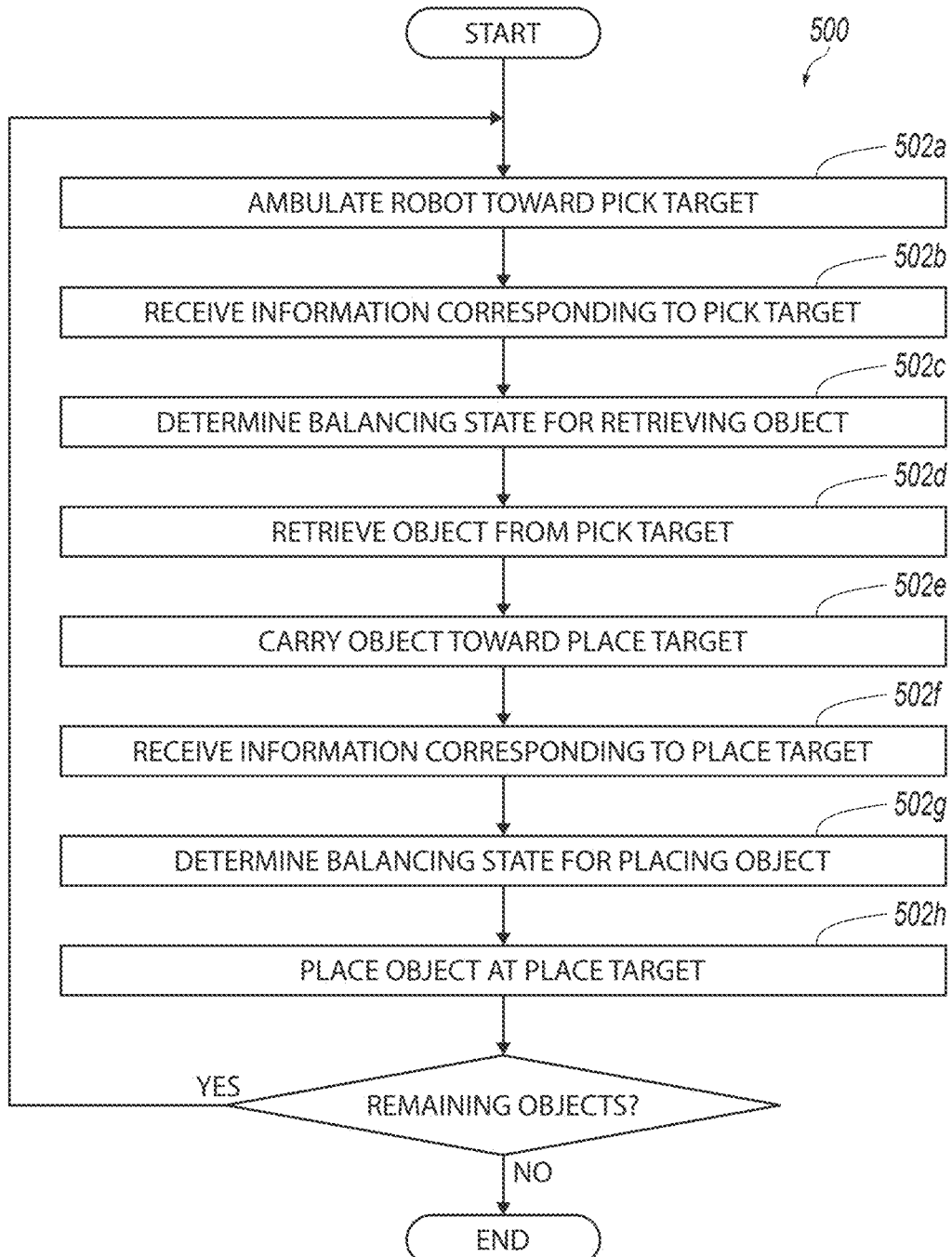
FIG. 47 is a block diagram corresponding to a method in accordance with at least some embodiments of the present technology.
Figure 48:
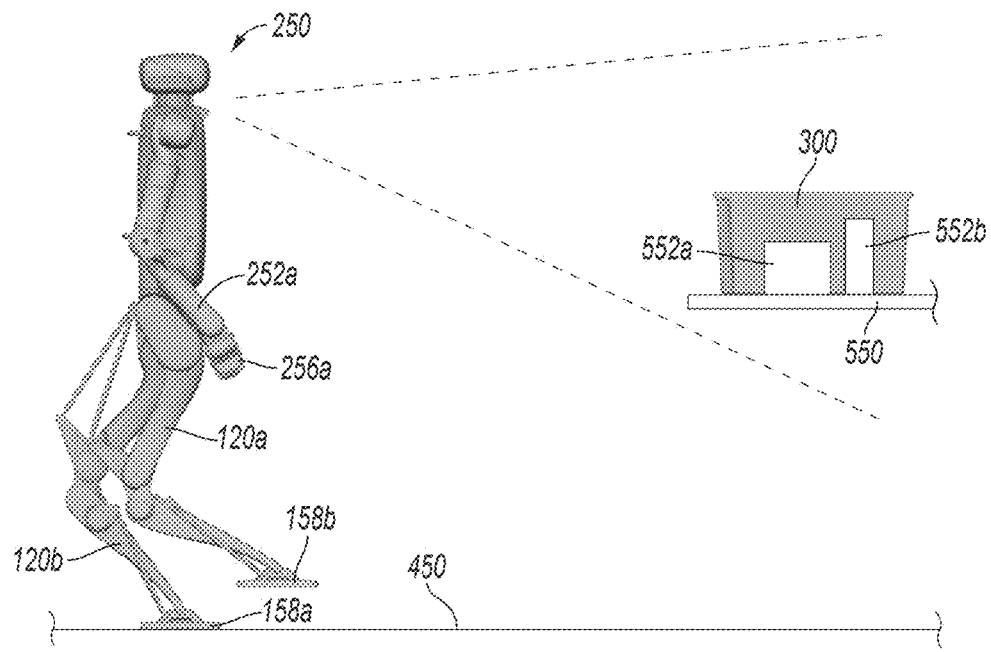
FIGS. 48-51 are side profile views of the robot shown in FIG. 36, the object shown in FIG. 37, and associated structures at different respective times before and while the robot retrieves the object during an embodiment of the method of FIG. 47.

The balancing state for retrieving and placing objects can be predetermined (e.g., standing for retrieving and non-standing for placing). Alternatively, the robot 250 can be configured to receive or to determine an advantageous balancing state for a given object-handling operation in real time or in near real time. Furthermore, the selection can be autonomous or semi-autonomous. The selection can occur at least partially via the electrical and computer system 177, such as via the computing components 178, via the communication components 182, and/or via the sensor components 189. FIG. 47 is a block diagram corresponding to a related method 500 in accordance with at least some embodiments of the present technology. The diagram includes blocks 502a-502h corresponding to different respective portions of the method 500. FIGS. 48-63 are side profile views of the robot 250, the object 300, and associated structures at different respective times during selected embodiments of the method 500. As with the method 400, the method 500 is shown and described primarily in the context of the robot 250 and the object 300, but can alternatively be implemented in other contexts, such as in connection with any of the counterparts described herein.

Figures 61, 62, 63:
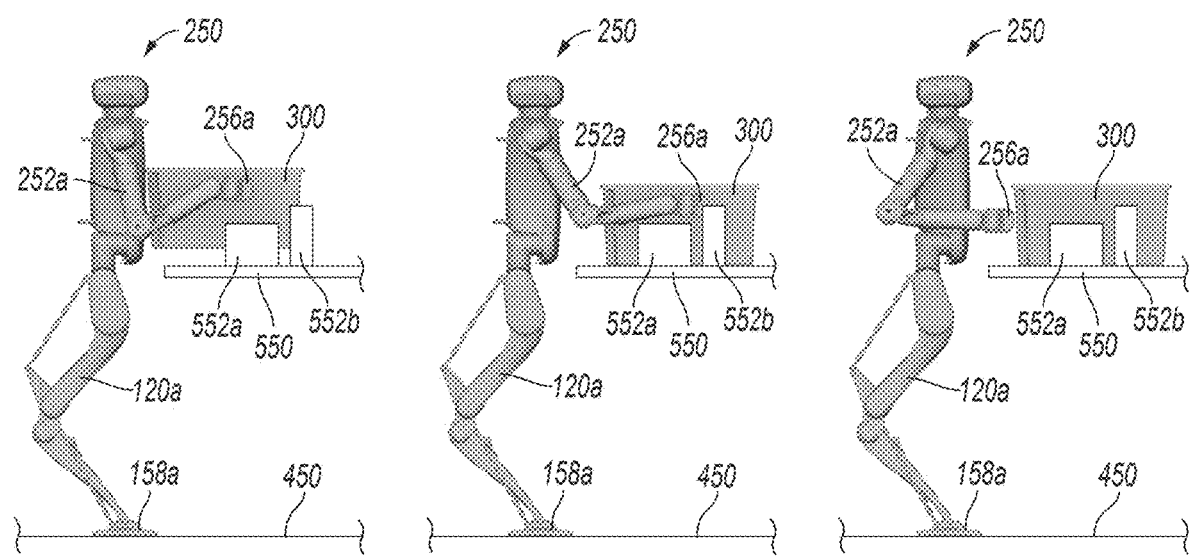

With reference now to FIGS. 1-63 together, the method 500 can include ambulating the robot 250 toward a pick target (block 502a). This can be the same as or similar to the corresponding operation described above for the method 400. The method 500 can further include receiving information corresponding to the pick target (block 502b). In at least some cases, the robot 250 receives data corresponding to the pick target via the sensor components 189 and generates information corresponding to the pick target based at least partially on the data. Examples of potentially useful information include an indication of the presence or absence of a peripheral obstruction at the pick target, a structure type for the pick target, an elevation of the pick target, a size of the pick target, and whether the pick target is moving. In the embodiment illustrated in FIGS. 48-51, the pick target is a table 550 carrying the object 300 and extraneous objects 552 (individually identified as extraneous objects 552a and 552b). The target estimator 213 can receive and interpret data (e.g., optical data) corresponding to the extraneous objects 552. For example, the target estimator 213 can receive a point cloud corresponding to the extraneous objects 552 via a LIDAR sensor of the robot 250. The target estimator 213 can then determine the presence of a peripheral obstruction at the pick target based at least partially on the data. Alternatively or in addition, the information can include position data and/or other data corresponding to another structure proximate to the object 300, such as another manipulatable object similar to the object 300 or a fixed portion of a structure carrying the object 300.

Figures 49, 50, 51:
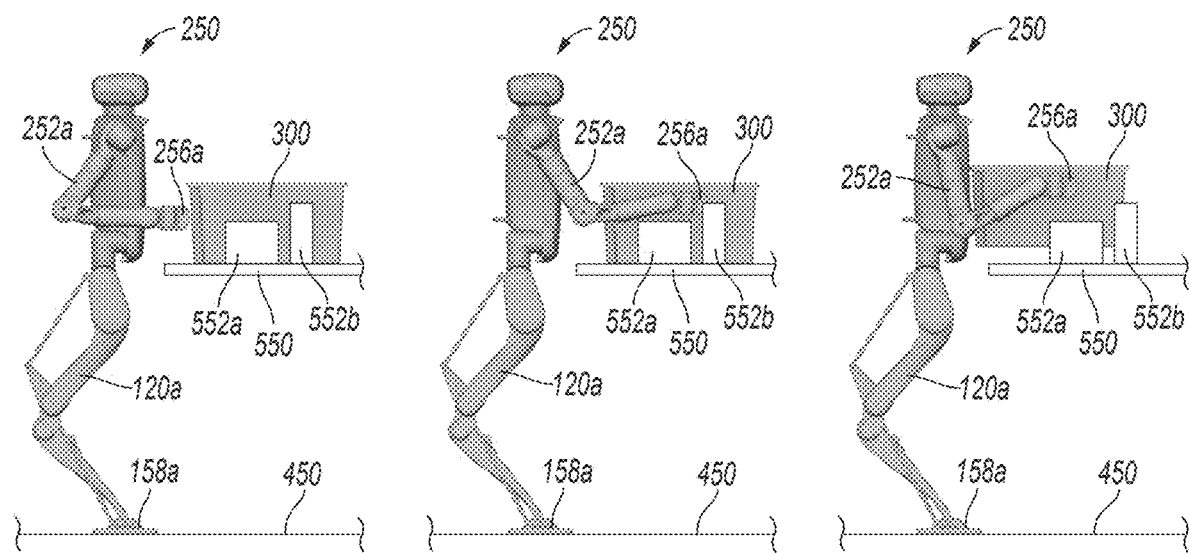
Figure 52:
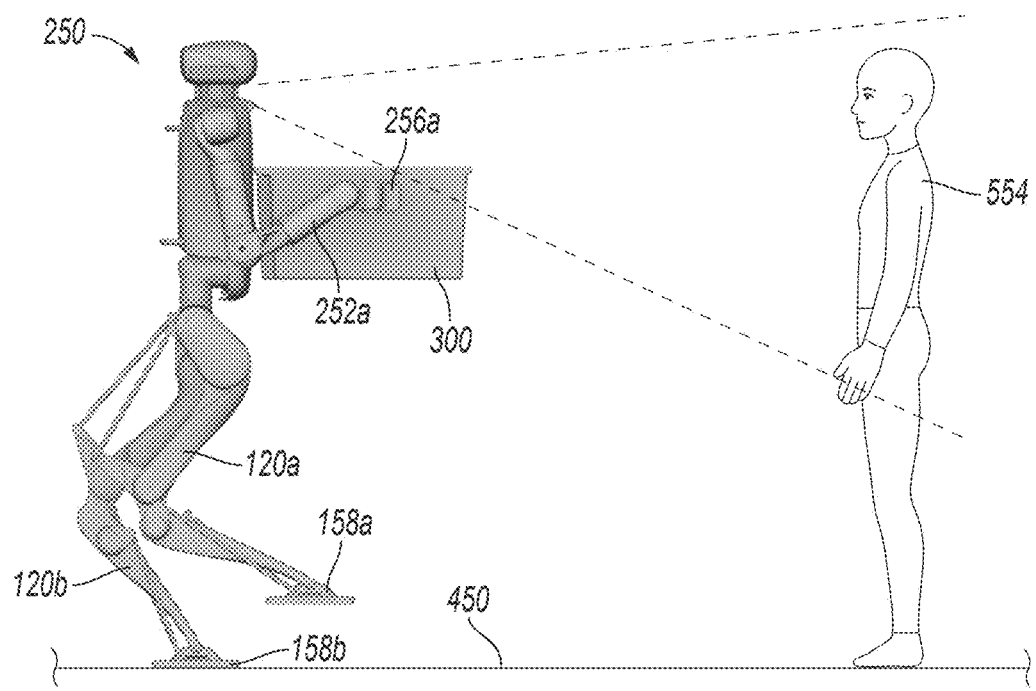
FIGS. 52-55 are side profile views of the robot shown in FIG. 36, the object shown in FIG. 37, and associated structures at different respective times before and while the robot places the object during an embodiment of the method of FIG. 47.
Figure 53:
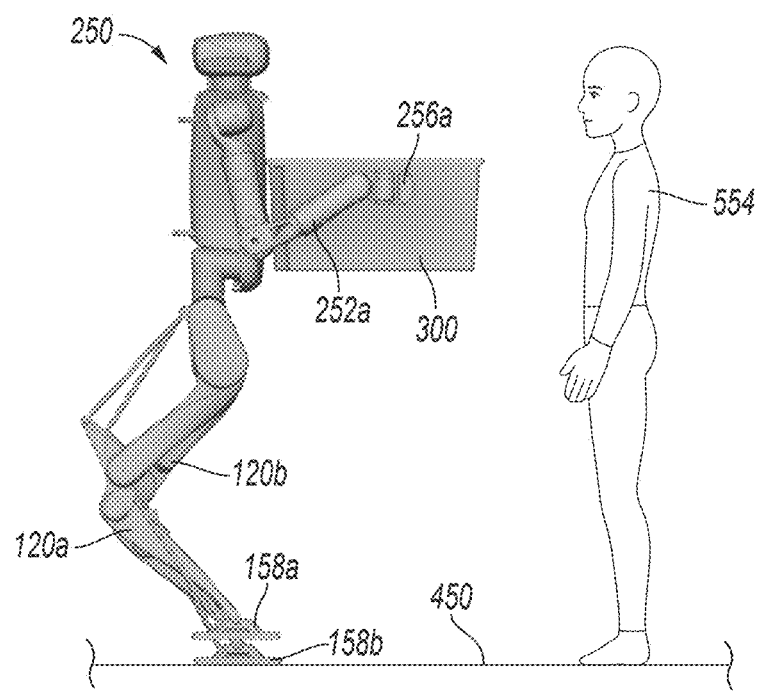
Figure 54:
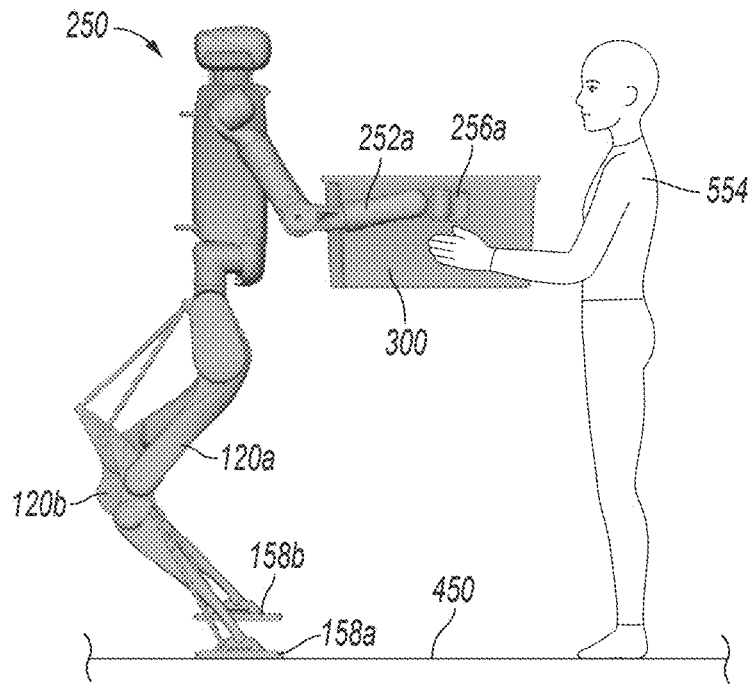
Figure 55:
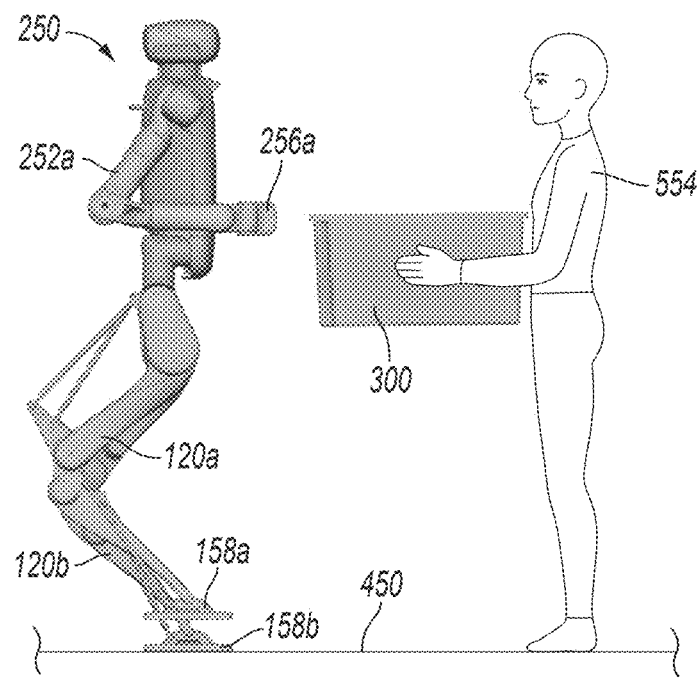
Figure 56:
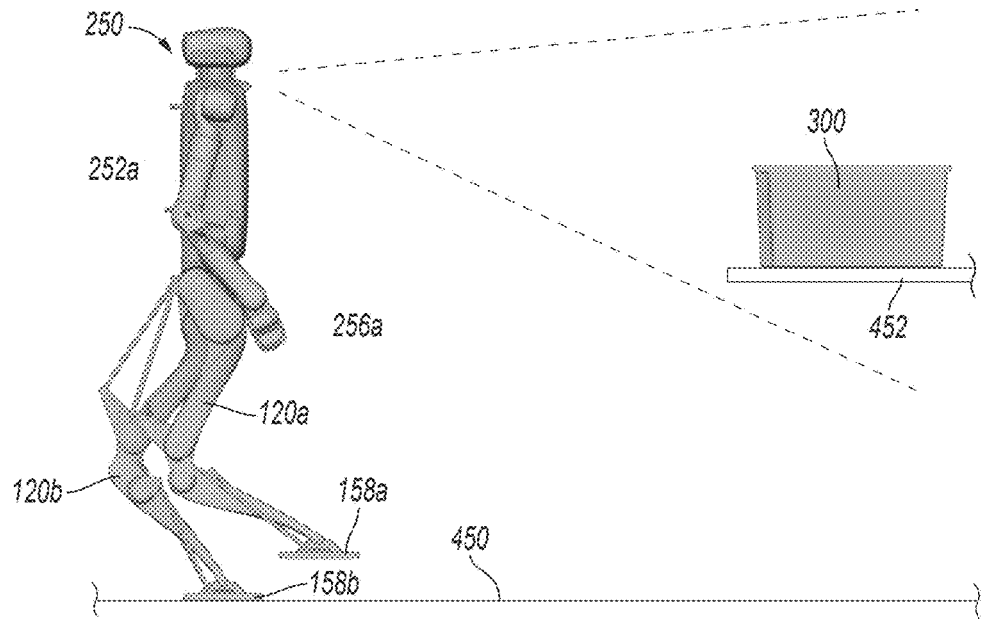
FIGS. 56-59 are side profile views of the robot shown in FIG. 36, the object shown in FIG. 37, and associated structures at different respective times before and while the robot retrieves the object during an embodiment of the method of FIG. 47.

The method 500 can further include determining a balancing state for retrieving the object 300 based at least partially on the information corresponding to the pick target (block 502c). In the illustrated embodiment, the information includes an indication of a presence of a peripheral obstruction at the pick target. Based on this information, the balancing state selection module 219 can determine to transition the robot 250 from a walking state to a standing state for retrieving the object 300 from the pick target. This can be advantageous, for example, to reduce a likelihood of the robot 250 displacing or damaging the extraneous objects 552. In at least some cases, the balancing state selection module 219 consults a library of predetermined instructions for different indications and determines a balancing state for retrieving the object 300 based at least partially on the predetermined instruction. The method 500 can further include retrieving the object 300 from the pick target (block 502d) while the robot 250 is in the selected balancing state. As shown in FIGS. 49-51, the robot 250 can extend the arms 252a, 252b, contact the object 300, and retract the arms 252a, 252b to move the object 300 toward the body 103 while the robot 250 is in a standing state and the feet 158a, 158b are planted on the floor surface 450. During these operations, the arms 252a, 252b can move with relatively high precision, thereby avoiding contact with the extraneous objects 552.

The method 500 can further include carrying the object 300 toward a place target (block 502e). This can be the same as or similar to the corresponding operation described above for the method 400. The method 500 can further include receiving information corresponding to the place target (block 502f). In at least some cases, the robot 250 receives data corresponding to the place target via the sensor components 189 and generates the information corresponding to the place target based at least partially on the data. Examples of potentially useful information include an indication of the presence or absence of a peripheral obstruction at the place target, a structure type for the place target, an elevation of the place target, a size of the place target, and whether the place target is moving. In the embodiment illustrated in FIGS. 52-55, the place target is a human 554. The target estimator 213 can receive and interpret data (e.g., optical data) corresponding to the human 554. For example, the target estimator 213 can receive an image of the human 554 via a camera of the robot 250. The target estimator 213 can then determine a structure type for the place target based at least partially on the data. As discussed above in connection with FIG. 35, the target estimator 213 can identify the structure type for the place target using a convolutional neural network trained on images of candidate structure types (e.g. shelves, tables, racks, floors, stacks, humans, other robots, etc.).

The method 500 can further include determining a balancing state for placing the object 300 based at least partially on the information corresponding to the place target (block 502g). In the illustrated embodiment, the information includes an indication of the structure type of the place target being a human. Based on this information, the balancing state selection module 219 can determine not to transition the robot 250 from a walking state to a standing state for placing the object 300 at the place target for efficiency and/or for another reason. Alternatively, the balancing state selection module 219 can determine to transition the robot 250 from a walking state to a standing state for placing the object 300 at the place target for safety and/or for another reason. In at least some cases, the balancing state selection module 219 consults a library of predetermined instructions for different indications and determines a balancing state for placing the object 300 based at least partially on the predetermined instruction. For example, the library may include an instruction to place objects while standing when the place target is a shelf, to place objects while walking when the place target is a table, to place objects while walking when the place target is a human, to place objects while standing when the place target is another robot, etc.

The method 500 can further include placing the object 300 at the place target while the robot 250 is in the selected balancing state (block 502h). As shown in FIGS. 52-55, the robot 250 can extend the arms 252a, 252b to move the object 300 away from the body 103, handoff the object 300 to the human 554, and then retract the arms 252a, 252b while the robot 250 is in a non-standing state. In at least some cases, at least one of the feet 158a, 158b moves relative to the floor surface 450 during these operations. Correspondingly, the arms 252a, 252b may move with lower precision than if the feet 158a, 158b were planted. This, however, may be inconsequential given the capacity of the human 554 to adapt to variability in a position of the object 300 during the handoff.

Figures 57, 58, 59:
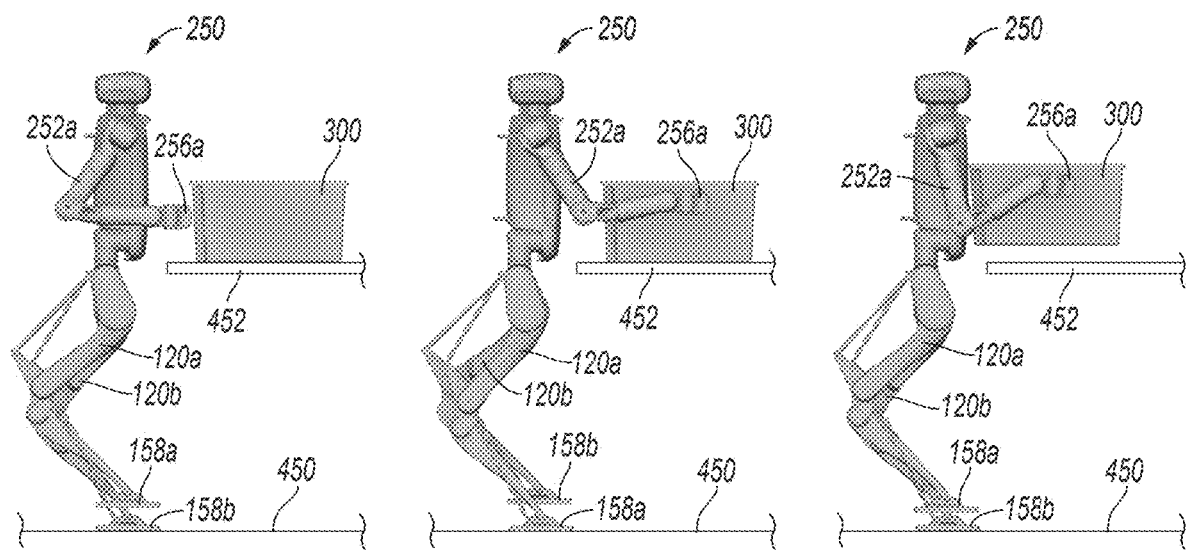
Figure 60:
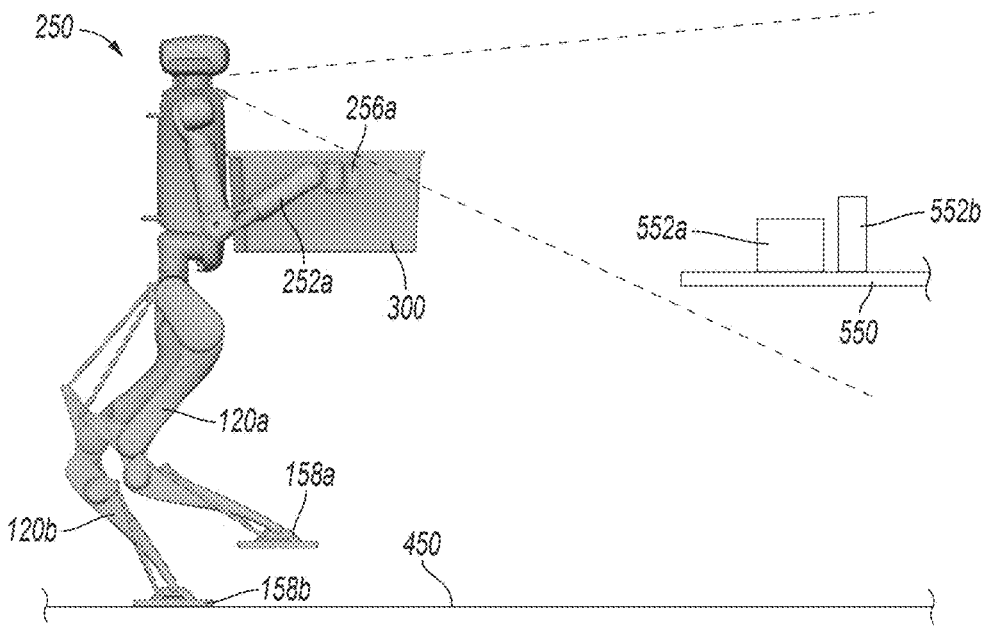
FIGS. 60-63 are side profile views of the robot shown in FIG. 36, the object shown in FIG. 37, and associated structures at different respective times before and while the robot places the object during an embodiment of the method of FIG. 47.

Retrieval of the object 300 as shown in FIGS. 48-51 and placement of the object 300 as shown in FIGS. 52-55 are merely examples. In other embodiments of the method 500, the robot 250 can retrieve and/or place the object 300 in other suitable ways. FIGS. 56-59 illustrate an alternative retrieval in an embodiment of the method 500. FIGS. 60-63 illustrate an alternative placement in the same or different embodiment of the method 500. In FIGS. 56-59, the pick location is the table 452, which is free of peripheral obstructions. Due to the lack of peripheral obstructions and/or for one or more other reasons, it may be advantageous to retrieve the object 300 without transitioning the robot 250 to a standing state. As shown in FIGS. 57-59, the robot 250 can extend the arms 252a, 252b, contact the object 300, and retract the arms 252a, 252b to move the object 300 toward the body 103 while the feet 158a, 158b move relative to the floor surface 450. In contrast, in FIGS. 60-63, the place location is the table 550, which carries the extraneous objects 552. Due to the presence of the extraneous objects 552 and/or for one or more other reasons, it may be advantageous to place the object 300 while the robot 250 is in a standing state. For example, as shown in FIGS. 60-63, the robot 250 can extend the arms 252a, 252b to move the object 300 away from the body 103 and into contact with the table 550 and then retract the arms 252a, 252b while the feet 158a, 158b are planted.

Although robot balancing-state coordinations is disclosed herein primarily in the context of object manipulations, other contexts are also within the scope of the present technology. For example, a method in accordance with at least some embodiments of the present technology includes determining whether or not to transition the robot 250 from a non-standing state to a standing state based at least partially on information corresponding to a structure the robot 250 encounters other than a target for retrieving or placing an object. The structure can be a structure with which the robot 250 interacts incidentally or intentionally while executing a plan. Examples include doors, stairways, elevators, escalators, workstations, other robots, humans, machine interfaces, and tools. It may be advantageous for the robot 250 to interact with some of these structures while in a standing state and to interact with others of these structures while in a non-standing state. In a particular example, the robot 250 may determine to transition from a non-standing state to a standing state before a pushing interaction that calls for high precision (e.g., pushing an elevator button) and to forgo transitioning from a non-standing state to a standing state before a pushing interaction that is tolerant of low precision (e.g., pushing a swing door).

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. Similarly, terms of anatomical direction, such as "distal" and "medial," may be used herein to express and clarify the relationship between various structures. In the context of a robot disclosed herein and in the absence of a statement to the contrary, such terms refer to the robot in a state corresponding to the first state of the robot 100 shown in FIGS. 1-3. Furthermore, terms corresponding to anatomical parts (e.g., "wrist," "elbow," "hip," "thigh," "calf," "torso," etc.) may be assigned arbitrarily and are intended to be interpreted in the context of the described embodiments rather than in the context of a human. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method of using a legged robot to move an object, the legged robot including feet and legs distally carrying the feet, the method comprising:
   retrieving, by the legged robot, the object from a pick target while the legged robot is in a first dynamic balancing state;
   carrying, by the legged robot, the object toward a human recipient spaced apart from the pick target in a working environment while the legged robot ambulates via the legs over a floor surface of the working environment; and
   placing, by the legged robot, the object at the human recipient while the legged robot is in a second dynamic balancing state,
   wherein the legged robot in the first dynamic balancing state maintains its balance while the feet are planted on the floor surface, and wherein the legged robot in the second dynamic balancing state maintains its balance while at least one of the feet moves relative to the floor surface.

2. The method of claim 1, wherein:
   the first dynamic balancing state is a standing state; and
   the second dynamic balancing state is a walking state.

3. A method of using a legged robot to move an object, the legged robot including feet and legs distally carrying the feet, the method comprising:
   retrieving, by the legged robot, the object from a pick target while the legged robot is in a standing state;
   carrying, by the legged robot, the object toward a place target spaced apart from the pick target in a working environment while the legged robot ambulates via the legs over a floor surface of the working environment; and
   placing, by the legged robot, the object at the place target while the legged robot is in a walking-in-place state,
   wherein the legged robot in the standing state maintains its balance while the feet are planted on the floor surface, and wherein the legged robot in the walking-in-place state maintains its balance while at least one of the feet moves relative to the floor surface.

4. The method of claim 3, wherein:
   the object has a first level of positional constraint at the pick target immediately before retrieving the object;
   the object has a second level of positional constraint at the place target immediately after placing the object; and
   the first level of positional constraint is greater than the second level of positional constraint.

5. The method of claim 3, wherein the place target is conformally adaptive to a position of the object.

6. The method of claim 3, wherein:
   the object, the pick target, and the place target are, respectively, a first object, a first pick target, and a first place target; and
   the method further comprises:
      ambulating the legged robot via the legs over the floor surface toward a second pick target after placing the first object,
      retrieving, by the legged robot, a second object from the second pick target while the legged robot is in the standing state,
      carrying, by the legged robot, the second object toward a second place target spaced apart from the second pick target in the working environment while the legged robot ambulates via the legs over the floor surface, and
      placing, by the legged robot, the second object at the second place target while the legged robot is in the standing state.

7. The method of claim 3, wherein:
   the object, the pick target, and the place target are, respectively, a first object, a first pick target, and a first place target; and
   the method further comprises:

ambulating the legged robot via the legs over the floor surface toward a second pick target after placing the first object, retrieving, by the legged robot, a second object from the second pick target while the legged robot is in the walking-in-place state, carrying, by the legged robot, the second object toward a second place target spaced apart from the second pick target in the working environment while the legged robot ambulates via the legs over the floor surface, and placing, by the legged robot, the second object at the second place target while the legged robot is in the walking-in-place state.

8. The method of claim 3, wherein:

the object, the pick target, and the place target are, respectively, a first object, a first pick target, and a first place target; and the method further comprises:

ambulating the legged robot via the legs over the floor surface toward a second pick target after placing the first object, retrieving, by the legged robot, a second object from the second pick target while the legged robot is in the walking-in-place state, carrying, by the legged robot, the second object toward a second place target spaced apart from the second pick target in the working environment while the legged robot ambulates via the legs over the floor surface, and placing, by the legged robot, the second object at the second place target while the legged robot is in the standing state.

9. The method of claim 3, wherein:

the legged robot includes first and second arms;

the object defines an object width; and carrying the object includes carrying the object while the first and second arms are in contact with the object at respective interfaces spaced apart from one another along the object width.

10. The method of claim 9, wherein retrieving the object includes moving the object toward a body of the legged robot via the first and second arms while the first and second arms are in contact with the object at the respective interfaces.

11. The method of claim 10, wherein placing the object includes moving the object away from the body via the first and second arms while the first and second arms are in contact with the object at the respective interfaces.

12. The method of claim 11, wherein:

the body includes a torso having a superior portion, an inferior portion, and an intermediate portion therebetween;

the legs are connected to the torso via the inferior portion of the torso; and the first and second arms are connected to the torso via the superior portion of the torso.

13. A method of using a legged robot to move an object, the legged robot including feet and legs distally carrying the feet, the method comprising:

retrieving, by the legged robot, the object from a pick target while the legged robot is in a walking-in-place state;

carrying, by the legged robot, the object toward a place target spaced apart from the pick target in a working environment while the legged robot ambulates via the legs over a floor surface of the working environment; and placing, by the legged robot, the object at the place target while the legged robot is in a standing state, wherein the legged robot in the standing state maintains its balance while the feet are planted on the floor surface, and wherein the legged robot in the walking-in-place state maintains its balance while at least one of the feet moves relative to the floor surface.

14. The method of claim 13, wherein:

the object has a first level of positional constraint at the pick target immediately before retrieving the object;

the object has a second level of positional constraint at the place target immediately after placing the object; and the first level of positional constraint is less than the second level of positional constraint.

15. The method of claim 13, wherein the pick target is conformally adaptive to a position of the object.

16. The method of claim 15, wherein the pick target is a human carrying the object.

17. The method of claim 13, wherein:

the legged robot includes first and second arms;

the object defines an object width; and carrying the object includes carrying the object while the first and second arms are in contact with the object at respective interfaces spaced apart from one another along the object width.

18. The method of claim 17, wherein retrieving the object includes moving the object toward a body of the legged robot via the first and second arms while the first and second arms are in contact with the object at the respective interfaces.

19. The method of claim 18, wherein placing the object includes moving the object away from the body via the first and second arms while the first and second arms are in contact with the object at the respective interfaces.

20. The method of claim 19, wherein:

the body includes a torso having a superior portion, an inferior portion, and an intermediate portion therebetween;

the legs are connected to the torso via the inferior portion of the torso; and the first and second arms are connected to the torso via the superior portion of the torso.

* * * * *